(12) United States Patent
Kite

(10) Patent No.: US 7,224,962 B1
(45) Date of Patent: May 29, 2007

(54) REMOTE OPERATIONAL SCREENER

(76) Inventor: Karen Jeanne Kite, 4018 McDougald Blvd, Stockton, CA (US) 95206

( * ) Notice: Subject to any disclaimer, the term of this patent is extended or adjusted under 35 U.S.C. 154(b) by 0 days.

(21) Appl. No.: 11/359,127

(22) Filed: Feb. 21, 2006

Related U.S. Application Data

(63) Continuation-in-part of application No. 10/843,529, filed on May 10, 2004, now Pat. No. 7,039,393, which is a continuation-in-part of application No. 09/639,386, filed on Aug. 15, 2000, now Pat. No. 6,792,263, and a continuation-in-part of application No. 08/943,833, filed on Oct. 3, 1997, now Pat. No. 6,104,923.

(51) Int. Cl.
*H04Q 7/20* (2006.01)

(52) U.S. Cl. .................... 455/412.1; 455/415

(58) Field of Classification Search ............ 455/412.1, 455/412.2, 414.1, 413, 434, 556.1, 556.2, 455/557, 567, 566, 415, 88.26, 70, 95.25
See application file for complete search history.

(56) References Cited

U.S. PATENT DOCUMENTS

| | | | |
|---|---|---|---|
| 4,890,314 | A | 12/1989 | Judd et al. |
| 5,027,219 | A | 6/1991 | Stuttler et al. |
| 5,189,691 | A * | 2/1993 | Dunlap .................. 379/70 |
| 5,374,971 | A | 12/1994 | Clapp et al. |
| 5,422,683 | A | 6/1995 | Tanigaki |
| 5,572,576 | A * | 11/1996 | Klausner et al. ...... 379/88.11 |
| 5,684,918 | A | 11/1997 | Abecassis |
| 5,728,960 | A | 3/1998 | Sitrick |
| 5,742,905 | A * | 4/1998 | Pepe et al. ............. 455/461 |
| 5,759,044 | A | 6/1998 | Redmond |
| 5,764,731 | A * | 6/1998 | Yablon ................ 379/88.15 |
| 6,040,811 | A | 3/2000 | Malhi |
| 6,148,213 | A * | 11/2000 | Bertocci et al. ......... 455/462 |
| 6,167,127 | A * | 12/2000 | Smith et al. ............ 379/209.1 |
| 6,275,251 | B1 | 8/2001 | Hartman et al. |
| 6,469,731 | B1 | 10/2002 | Saburi |
| 6,489,934 | B1 | 12/2002 | Klausner |
| 6,492,973 | B1 | 12/2002 | Kuroki et al. |

(Continued)

*Primary Examiner*—Jean Gelin

(57) ABSTRACT

This invention provides an audible remote screening function or device for use with an answering device or machine and may also combine this screening function with an ability for remote operational control of an answering device or machine. Preferred forms of the invention provide for remote call screening of an answering device or machine, or remote call screening of an answering device or machine together with remote operational control of an answering device or machine, with the capability to remotely operate and/or remotely screen calls (incoming or pre-recorded) of that of an answering device or machine from a remote area or room via the remote function or device. In preferred forms: the audible remote screening from the device can be heard across a room or from another room; the remote device can be made to stay in an active ON mode eliminating any need for the user to search, locate, or activate the remote device or any command signal per call being screened; the remote operational control and/or screening device can be directly plugged in allowing for simultaneous power and recharge abilities for continuous power and uninterrupted operation ability; a remote-override switch located on an answering device or machine for privacy control over unauthorized access to the answering device or machine from the remote device; and small size for portability. The functions and capabilities of the remote device can be implemented, combined and used in conjunction with/into any other unit or housing. This invention also provides visual screening functions.

15 Claims, 16 Drawing Sheets

U.S. PATENT DOCUMENTS

| | | |
|---|---|---|
| 6,504,990 B1 | 1/2003 | Abecassis |
| 6,507,356 B1 | 1/2003 | Jackel et al. |
| 6,510,325 B1 | 1/2003 | Mack, II et al. |
| 6,518,993 B2 | 2/2003 | Kerai et al. |
| 6,545,697 B1 | 4/2003 | Parker et al. |
| 6,549,229 B1 | 4/2003 | Kirby et al. |
| 6,552,720 B1 | 4/2003 | Gartrell et al. |
| 6,556,235 B1 | 4/2003 | Saburi |
| 6,590,548 B1 | 7/2003 | Mizutani et al. |
| 6,590,601 B2 | 7/2003 | Sukeno et al. |
| 6,593,955 B1 | 7/2003 | Falcon |
| 6,597,568 B2 | 7/2003 | Ryder |
| 6,601,040 B1 | 7/2003 | Kolls |
| 6,606,111 B1 | 8/2003 | Kondo et al. |
| 6,624,841 B1 | 9/2003 | Buchner et al. |
| 6,626,543 B2 | 9/2003 | Derryberry |
| 6,633,231 B1 | 10/2003 | Okamoto et al. |
| 6,651,118 B2 | 11/2003 | Carau, Sr. et al. |
| 6,667,759 B2 | 12/2003 | Gerszberg et al. |
| 6,670,982 B2 | 12/2003 | Clough et al. |
| 6,693,661 B1 | 2/2004 | Vanderwilt et al. |
| 6,714,233 B2 | 3/2004 | Chihara et al. |
| 6,724,416 B1 | 4/2004 | Liu |
| 6,724,868 B2 | 4/2004 | Pradhan et al. |
| 6,753,899 B2 | 6/2004 | Lapalme et al. |
| 6,775,361 B1 | 8/2004 | Arai et al. |
| 6,781,635 B1 | 8/2004 | Takeda |
| 6,788,332 B1 | 9/2004 | Cook |
| 6,789,228 B1 | 9/2004 | Merril et al. |
| 6,791,597 B2 | 9/2004 | Ando et al. |
| 6,832,724 B2 | 12/2004 | Yavid et al. |
| 6,865,400 B2 | 3/2005 | Oh et al. |
| 6,866,388 B2 | 3/2005 | Yang |
| 6,873,460 B1 | 3/2005 | Burstyn et al. |
| 6,882,864 B2 | 4/2005 | Miyake |
| 6,897,845 B2 | 5/2005 | Ozawa |

\* cited by examiner

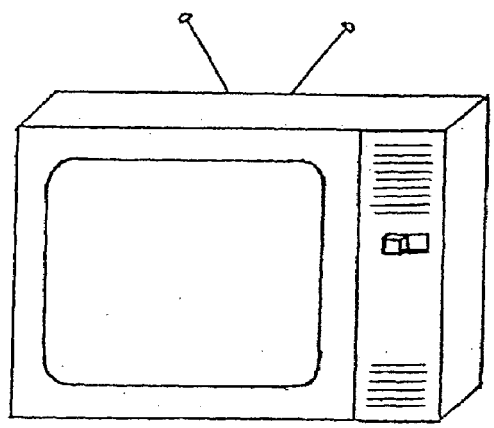
FIG 10
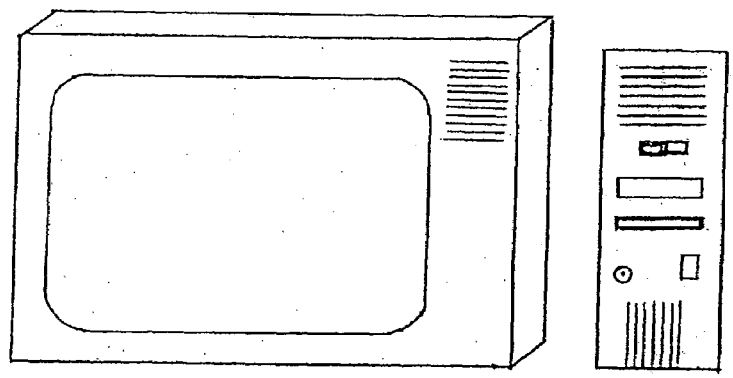
FIG 11
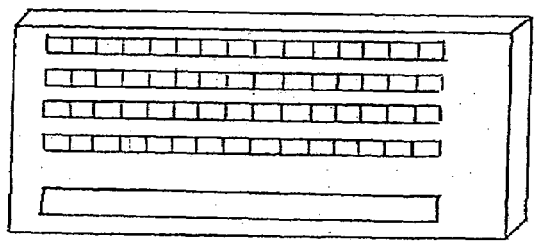
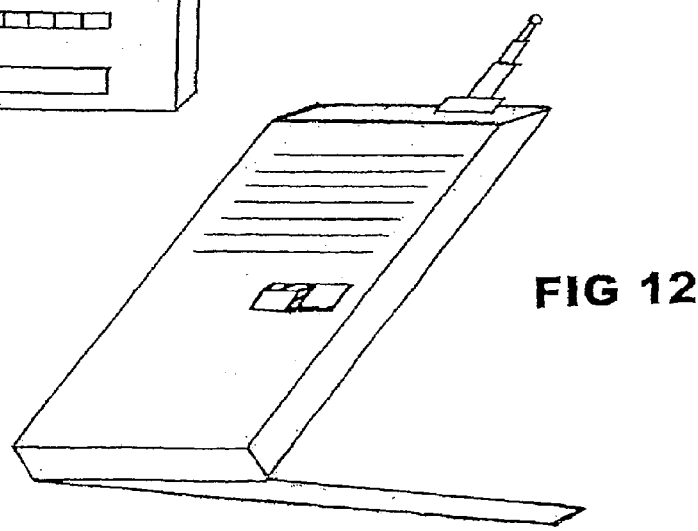
FIG 12

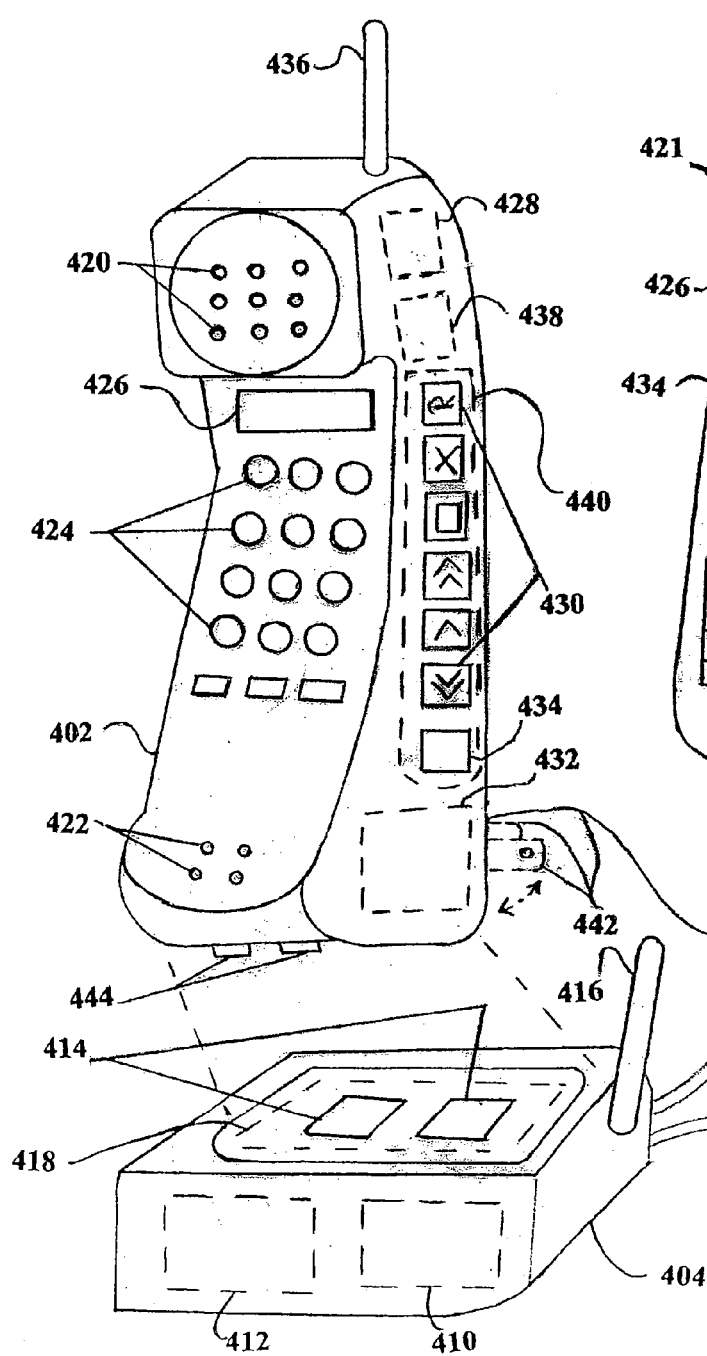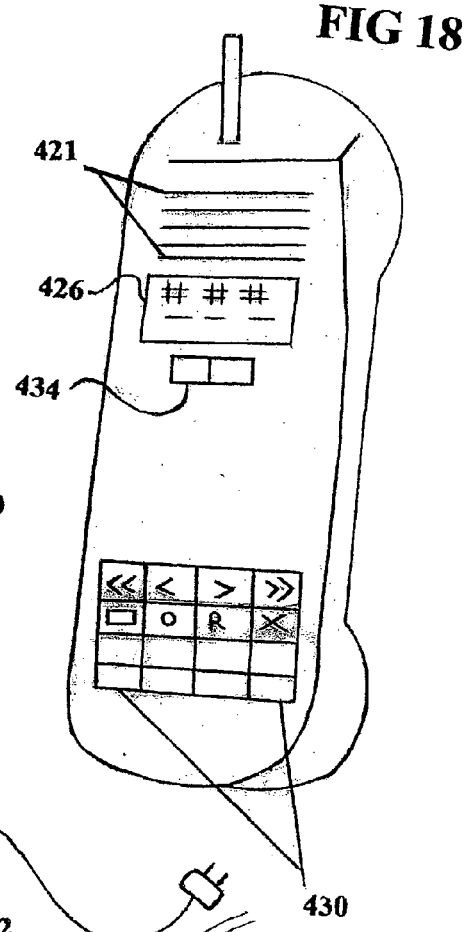

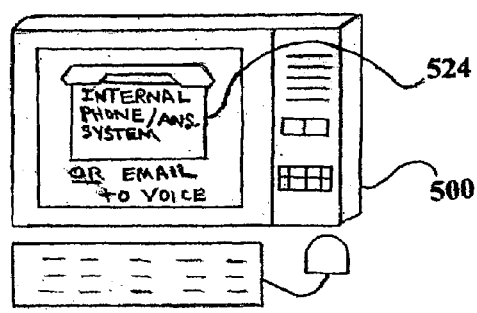
FIG 19A
FIG 19B
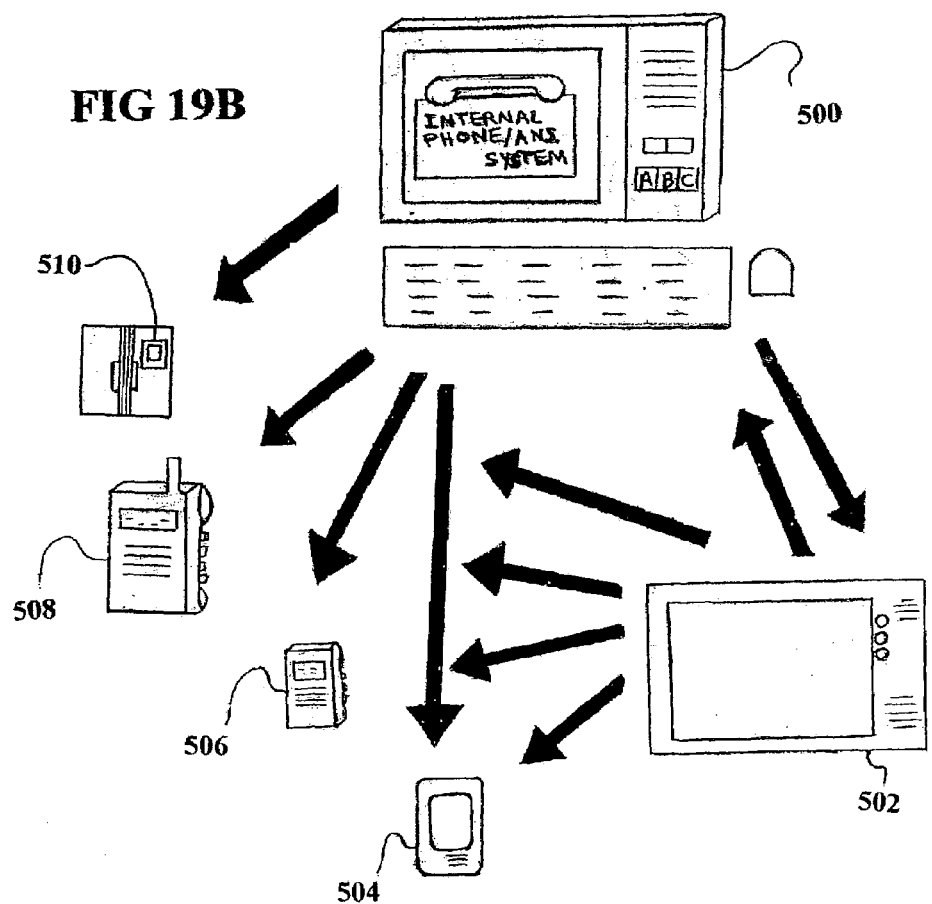

REMOTE OPERATIONAL SCREENER

CROSS REFERENCE TO OTHER APPLICATIONS

This application is a Continuation-In-Part of continuation-in-part Ser. No. 10/843,529 filed May 10, 2004 now U.S. Pat. No. 7,039,393 of continuation-in-part application Ser. No. 09/639,386, filed Aug. 15, 2000, now U.S. Pat. No. 6,792,263 Sep. 14, 2004 and parent application Ser. No. 08/943,833, filed Oct. 3, 1997, now U.S. Pat. No. 6,104,923 issued Aug. 15, 2000.

BACKGROUND

1. Field of Invention

This invention is cross referenced with Co-Pending application Ser. No. 10/017,529, Provisional Filed Dec. 12, 2000; Utility Filed Dec. 12, 2001.

This invention relates generally to telephone answering machines, and more particularly to a remote call screening device that allows a user to monitor and screen incoming telephone calls.

2. Description of Prior Art

Originally, answering machines could only provide the user with two ways of screening or monitoring his incoming telephone calls. One way is to play back a previously recorded message that was left on an answering machine. The other way is to listen to the loudspeaker of an answering machine at the same time that the caller is leaving the message. In other words, screen the caller. If at this point the user options to converse with the caller, the user can then pick up a telephone plugged into or near the answering machine. But if the user is in a remote location, away from the answering machine unit, such as in another room or across the house, the user may hear the ringing signal of the telephone but will not be able to screen the incoming telephone call to decide whether or not he wishes to pick up the telephone and speak with that calling party, without his having to run to the other room or across the house to where the answering machine itself is located, in order to hear or screen the caller, who is leaving a message, through the loudspeaker of the answering machine.

Also, answering machines are only accessible in limited ways. One way is by direct manipulation of the actual answering machine unit. The second way is by an outside telephone line with touch-tone capabilities or "beeper remote". The third way is by a cordless, touch-tone, telephone with corresponding circuitry integrated within a matching answering machine unit. And this last example is limited in its accessibility to an answering machine.

U.S. Pat. No. 4,881,259 to Scordato (1989) provides an audio "screening mode" in a cordless, touch-tone telephone integrated within an answering machine unit.

A Caller ID provides a visual "screening method" whereby the telephone number from where a caller is calling from (and sometimes a name associated with that particular telephone number) is displayed on an LCD screen, sometimes with an option to store a limited amount of telephone numbers. Caller ID requires that a special Caller Identification Service be used in conjunction with a Caller ID unit. A Caller Identification Service must be purchased from a telephone company, in addition to your regular telephone service, in order to be able to use a Caller ID. The Caller ID units are singular units within themselves or are integrated within a cordless telephone receiver of an integrated cordless telephone and its matching base unit.

Nevertheless, Scordato U.S. Pat. No. 4,881,259 and Caller ID suffer from a number of disadvantages:

(a) The use of Scordato's system requires a phone.

(b) The use of Scordato's system requires a cordless phone.

(c) The use of Scordato's system requires a cordless telephone that must be integrated with its own matching answering machine/recharger base unit.

In the use of Caller ID units that are included within cordless telephone receivers, the cordless telephone receiver also must be integrated with its own matching recharger base unit.

(d) The Scordato system requires that a switch actuator on the cordless receiver unit be turned "on" in order to activate the "screener mode" in the matching base answering machine unit. This switch actuator must be turned "on" per incoming call in order to be able to screen incoming calls. Scordato's invention must be in one of either an active mode "screen mode" or in a passive mode "non-screen mode". In order to hear/screen an incoming call, the "screen mode" must be activated at the time that a caller is presently calling, and re-activated at the time of each additional call, requiring that the user has to locate and physically be at the cordless telephone receiver of the matching answering machine base unit in order to physically manipulate the actuator command signal (turn it "on") in order to activate the "screen mode" in the answering machine base in order to be able to use this screening function.

(e) The user of the Scordato invention has to physically be at the remote cordless telephone receiver of the matching answering machine base unit, hands on, putting receiver to ear in order to hear the calls being screened as messages are being left.

With Caller ID, the user has to be close enough to pick up and/or be in eyesight (reading) range of any Caller ID unit in order to be able to read the telephone number information on the LCD screen.

(f) With the Scordato invention, telephone calls cannot be screened or listened to by more than one person simultaneously, such as family members who are waiting for their own prospective callers, because the cordless telephone handset receiver of the Scordato invention can only be put to one user's ear at a time in order to hear the call being screened, and only the person whose ear is on the receiver can hear the call being screened.

(g) Scordato's invention has a manufacturer installed, fixed "family code" shared between the answering machine/recharging base unit and its cordless telephone handset receiver unit, thereby limiting its screening use to just one remote screening device: that of the matching cordless telephone handset receiver.

In the cordless telephone version of Caller ID there is also only one cordless telephone receiver per matching recharging base unit, thereby limiting screening use to just one cordless receiver unit.

(h) In Scordato's invention, a cordless telephone handset receiver needs recharging at a home base unit. Therefore, because a cordless telephone receiver consistently needs recurring recharging or sometimes full charging, the receiver is not always capable of being in a convenient or remote location where a user may happen to be.

The same is true of the cordless telephone version of Caller ID, as it also needs recharging at a home base unit. Therefore it also is not always capable of being in a convenient or remote location where a user may happen to be.

(i) In Scordato's invention, the only way to turn the screening mode Off and On has its location in the cordless telephone handset receiver unit. Because there is no separate On/Off switch on the matching answering machine/base unit itself to keep the screening mode on the cordless telephone handset receiver from operating (to disable the screen mode on the cordless handset receiver) at the user's discretion, this does not afford the user/owner with any privacy or control over somebody else picking up the cordless telephone handset receiver and remotely screening the owner's incoming or recorded calls that were left on his answering machine. The user's/owner's only option for this would be to turn the whole answering machine unit off.

(j) In Scordato's invention, the answering machine/base unit does not have an indicator to show that the screen mode is "on" and being used from the cordless telephone handset receiver, thus the user/owner is not able know when somebody else may be operating the screen mode from the cordless telephone receiver and listening to the user's/owner's personal calls. This lacking, also, does not afford the user/owner the option to control his privacy.

(k) The Scordato invention is not capable of recharging and being in a screen mode concurrently, therefore putting limitation on screening availability.

The cordless telephone version of Caller ID is also not capable of recharging and being in a screen mode concurrently, limiting available screening time.

(l) The cordless telephone receiver cannot plug directly into an AC outlet for a constant source of power, again limiting its available screening time to when the cordless telephone receiver is not being recharged in its base.

The same is true, again, of the cordless telephone version of Caller ID.

(m) The cordless telephone receiver is not equipped with a source for an optional adapter plug with cord in order to maintain an active screen mode and a concurrent constant source of power.

The same is true of the cordless telephone version of Caller ID.

(n) There are many other reasons that Caller ID is not very practical, such as:

Most people only have a few telephone numbers memorized in their heads, therefore, as a calling party is calling, the user of Caller ID must rack his brain as to whom the phone number belongs to that is being displayed on the LCD.

If a user is expecting or receiving a call from a first-time caller, the user of Caller ID probably won't have any idea whose phone number is being displayed on the LCD screen of his Caller ID unit. And even if a name is displayed with the telephone number, the user still has no way of knowing who is really on the line nor no way of finding out the content of the call, what it's regarding, etc. through a Caller ID.

If the user is expecting a call from a favored someone (favored caller) who happens to be calling from a different phone or location than what is stored for them in the Caller ID unit or memorized in the user's head for that particular person, the user is at a loss as to who is calling.

The user may not wish to converse with other-wise-favored callers at certain particular times, though these callers may have their phone numbers stored as preferred caller numbers in the Caller ID unit.

The user may not wish to converse with a caller depending on what kind of message the caller has for him or what the caller has to say, and a Caller ID LCD phone number display is not going to help in these instances, whether or not the caller is calling from a preferred number.

The user may wish to speak to only a certain particular caller from a selected stored phone number and not to the other people that may live there at that same number, but the user of the Caller ID unit is not able to discern who from that telephone number really is calling.

So, in regards to that just mentioned, and also for that of non-stored telephone numbers or non-familiar telephone numbers, in order to really screen his calls, the user would then still need to be at his answering machine unit in order to hear the calls being screened, despite having Caller ID.

(o) Caller ID requires that a special Caller Identification Service be used in conjunction with a Caller ID unit. The service must be purchased from a telephone company in addition to your regular telephone service in order to be able to use a Caller ID system. This service is only available where the service is provided.

(p) In order to protect their own safety and privacy, most consumers have chosen to block Caller ID so that their own personal telephone numbers will not be forwarded to someone else's Caller ID unit, in order to keep their telephone number private and their location private, for safety and other privacy reasons.

OBJECTS AND ADVANTAGES

Accordingly, there are several objects and advantages of the present invention, and with additional features, there are even still further objects and advantages. The remote screening device and/or its functions and capabilities, and the remote operational/screening device and/or its functions and capabilities of the present invention are herein referred to as Remotes. Call receiving and storage devices will mostly be referred to as answering machines, but are not restricted to such. Objects and advantages of the present invention are:

(a) To provide an externally audible Remote screening device to be used for or with a call receiving and storage device including call answering machine, service, device, or message storage.

(b) To provide an externally audible Remote screening device with remote operational capabilities to be used for or with a call receiving and storage device including call answering machine, service, device, or message storage.

(c) To provide an answering machine Remote device(s) that is not limited to the use of a phone. No phone is needed.

(d) To provide answering machine Remote device(s) that are not limited to use of a cordless telephone or any other type of phone. No specific type of phone is needed.

(e) To provide Remote device(s) that are not limited to touch-tone use or signal tone use.

(f) 1. To provide Remote device(s) that can be heard, listened to, and understood (is audible) from a distance away from the actual Remote screening device, such as heard from across a room or heard from another room or area (because a Remote is outwardly audible), without necessitating that a user has to physically be at the place where a Remote unit is presently located. Without necessitating that the user, as in the case of the Scordato patent, have to get up and go across a room or go to another room in order to pick up the cordless screening telephone receiver because of the need to put the cordless screening telephone receiver up to one's ear in order to hear the caller being screened.

2. To provide a Remote device where the user does not have to be within reading distance of a visual screening unit, as is the case with Caller ID, in the order that he must see a phone number being displayed in order that he may screen a call.

(g) 1. To provide for a Remote device(s) that allows for more than one person at a time to be able to hear the calls being screened. The calls can be screened simultaneously by, for example, the whole family, roommates, co-workers, etc. allowing for all of them to screen, or listen, simultaneously, while waiting for their own individual, prospective callers, as there is no need to put a screening telephone receiver up to any one individual's ear. My invention is outwardly audible and can be heard from a distance from itself, eliminating the limitation of only one user at a time who can screen. This thereby allows for every individual, in a household, for example, to discern whom the call is for and discriminate whether or not it is for him or her.

2. To provide for a Remote device where there is no need for everyone to get up to look at and read a telephone number being displayed on a visual display screen in order to screen their calls.

(h) To provide a Remote device(s) that is able to stay and remain in an active screening mode (On) without necessitating that the user, as in the case of the Scordato patent, has to actively search, locate, and/or physically be at a screening telephone handset receiver unit in order for the user to have to activate a command that allows for the screening process per incoming call. Eliminating this requirement, and/or providing alternative methods, allowing for a Remote device to remain and stay in an active (On) mode, provides for convenience, and is also thus potentially faster as the user is not likely to miss screening a call, or part of a call, due to a possibility of having to spend time searching for a screening handset receiver that may be located elsewhere in another room or across the house, for example, and then, once located, having to activate its screening process.

Depending on Embodiment, Further Objects and Advantages are:

(i) To provide remote operational and/or screening devices, units, or capabilities that either/and/or:

1. Do not require a fixed "family code" between an answering machine and Remote device(s), as this can limit the user to just the matching Remote devices that may be packaged along with a paired answering machine and can further limit the possible later purchase of additional Remote devices for the possible use in more areas, or rooms, at a time, and/or possibly, 2. By providing that Remotes may be made to be programmable to work with an answering machine, and/or that Remotes may be made to be manipulated into fitting into a fixed "family code" of an already purchased answering machine that has a fixed "family code", and/or possibly, 3. By providing that answering machines can be manufactured as "Remote compatible", this allows the possible purchase and addition of multiple Remote devices or units at later dates, and/or possibly, 4. By providing that several Remote devices at a time can be packaged along with its paired answering machine unit. This may or may not involve a fixed "family code".

(j) To provide a Remote capability or device that can give the choice of different channels or frequencies for:

1. best reception abilities, and/or 2. so that other persons in, e.g. the same household or neighboring area, may own and operate their own individual Remote units and answering machine units, without interference from or with another neighboring person's units.

(k) To provide a Remote device that can plug directly into an AC outlet for a constant source of screening and/or operating power.

(l) To provide a Remote device that has the capacity to recharge and still be able to concurrently operate, and/or receive and transmit a screened call so that screening and/or operating usage can be indefinite.

(m) To provide a Remote device(s) that doesn't need recharging in a "home base" unit, thereby adding to its convenience, as a Remote unit or device is more capable of constantly being available to the user in remote locations without having to return it to a "homebase" recharging unit. And with the use of multiple Remote units or devices, several variable remote locations are available simultaneously for placement.

(n) To provide a Remote device with the means to remotely operate and access the functions of an answering machine.

(o) To provide an answering machine with a separate On/Off control switch for the overriding control of the Remote device(s). This Remote-override control switch, located on the answering machine, separate from the answering machine's own main On/Off switch, allows the user to turn Off the Remote(s)' abilities from the location of the answering machine unit itself without having to turn off the whole answering machine. This thereby prevents someone else from unauthorized remote usage of the Remote unit(s). This overriding control switch provides the user with control of his privacy; no one will be able to remotely screen the user's calls nor operate the user's answering machine from the Remotes, and, yet, the user is still left with the operable use of his answering machine's own usual functional capabilities, as the answering machine is still in its own On mode.

(p) To provide a simple to use Remote device or unit, preferably small in size, and light in weight, with a greater ease of portability, that can be kept and/or transferred to and from inconspicuous placements, providing for greater accessibility.

(q) To provide the user with an answering machine remote operational device that provides life with a little more convenience, saving time and labor, as the user will have the ability to operate and access his answering machine and/or screen his calls (incoming or recorded) remotely from another room, from a distance, or from outside, away from an answering machine unit, with a Remote unit, device, or capability. A Remote can be remotely placed, and simultaneously be kept in an active On mode. This eliminates any need for the user to have to get up and/or turn On any activation mechanism per incoming call being screened.

(r) To provide and realize an almost untapped market and an existing need. What is on the market is either relatively unknown, uneconomical, and/or unpractical. Since portable phones with their matching answering machines can be a relatively expensive purchase, what my invention provides is more economical for the consumer than the Scordato patent, as in a preferred embodiment there is no need for the purchase or use of a cordless phone, and more than one Remote can be used with, and/or included with, an answering machine.

In order to use a Caller ID system, a person must pay not only for the special equipment, but they must also pay a phone company for the added Caller ID service that must be purchased in order to be able to use Caller ID. And, most importantly, Caller ID is not very practical; Since most people don't like their telephone numbers being given out, and most people have opted to block Caller ID, which means that no matter even if a user has Caller ID service, those numerous people who have blocked Caller ID have phone numbers that are not accessible to the user with a Caller ID system: They are "unscreenable".

(s) To provide for a more cost effective means for manufacturers and consumers:

1. Since circuitry is less complicated than the Scordato patent, it should be cheaper to build, and in turn should be less expensive for consumers to buy. Less expensive equals more affordability for the consumer, which, in theory, equals a higher probability that the masses will buy.

2. Most households contain at least one answering device or machine. Most answering machines are replaced every few years; therefore my invention should be easy to sell not only to consumers, but to manufacturers as well.

3. In providing the option of more than one Remote, or numerous Remotes that are capable of being used in conjunction with or interacting with a telephone answering device or machine, and/or the option of being able to use and purchase additional Remotes at a later date than the original purchase of an answering device or machine, gives the purchaser a broader consumer choice and a greater array of remote abilities. This is also another potential selling point to and for a manufacturer.

4. Even throughout a changing technology, my invention could be made and sold for many years without becoming outmoded or obsolete. Hence, it has a long life cycle potential, which would justify capital expenditures for tooling and conducting advertising campaigns.

The user is thus provided with a remote call screening unit or capability, and/or remote call screening unit or capability along with remote operational capability, to be used to listen to, remotely screen, and/or remotely operate and access an answering machine, with either of the units (the Remote or the answering machine), or each unit, having appropriate inner workings to allow such capabilities, the features not restricted to any particular type of telephone or to any telephone at all. Such an invention has not even been hitherto available.

Still further objects and advantages, many not already mentioned above, will become apparent from a consideration of the ensuing specification, claims, and drawings.

BRIEF DESCRIPTION OF THE DRAWINGS

FIG. 1A shows a front perspective view of a possible basic Remote without On/Off or volume control, that is "On" and audible as long as power source is available.

FIG. 1B shows a perspective view of a possible basic Remote that includes volume control, the unit being "On" as long as there is a power source available.

FIG. 1C shows a possible embodiment of a Remote with single or combined "On/Off"-volume controller.

FIG. 1D shows a possible embodiment of a Remote with "On/Off" control, without a volume control, the unit audible as long as unit is turned "On".

FIG. 1E shows a possible embodiment of a Remote with separate "On/Off" and volume controls.

FIG. 10 shows possible embodiment of Remote included within a TV set.

FIG. 11 shows possible embodiment of Remote included within a computer system.

FIG. 12 shows possible embodiment of Remote included within a cellular phone or car phone.

FIG. 17 shows an integrated device with a handset that combines the functions of a cordless telephone receiver with those of an answering machine and call screening Remote unit.

FIG. 18 shows a rear view of the handset of FIG. 17.

FIGS. 19A–19F show pictorial schematics of various embodiments and systems of a call screening device according to the present invention.

SUMMARY OF THE INVENTION

Figure 1A:
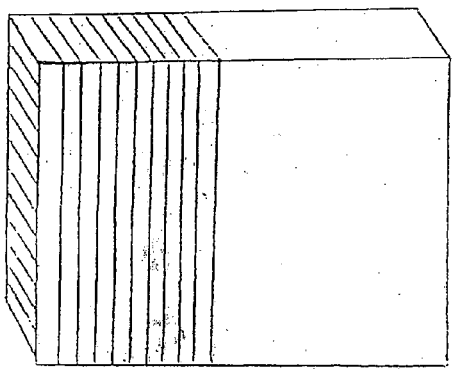
FIGS. 1A, 1B, 1C, 1D, 1E show front perspective views of some of many possible variants of basic Remotes in self-contained units.

In a household, as also in some businesses, there is usually only a single telephone answering device or answering machine unit. The answering device or answering machine unit is located in one room of the house, or business, and usually more than one telephone extension of that same phone line is spread throughout the house with different telephones in different rooms. This poses a problem when someone in one room wants to access the answering machine, or screen an incoming (or recorded) call, and that answering machine is located in another room across the house. How does the user accomplish this without having to get up to go into the room where the answering machine unit is located? The solution is as follows:

Example: When an answering device or answering machine (preferably of the remote pick-up type) receives a caller's message, it simultaneously picks up and transmits the caller's voice to the user who, away from the answering machine unit, in some remote location, hears the caller's voice through a Remote unit or device. The user hears the caller's voice and can screen the call as the message is being left, through the Remote unit or device, though he is not at the location of the answering machine. The user is able to do this through the interacting of the Remote(s) with an answering machine, which allow the user (from a remote location, away from the answering machine unit) to conveniently screen calls, or select which calls he options to pick up and speak with, all at the same time that the calling party is currently leaving a message. The user can have the ability of screening incoming calls, (and/or recorded calls, depending on embodiment), hear who's calling and the content of the message, from any convenient place, such as e.g. another (remote place) room in the house, outside of the house, etc. Depending on embodiment, the Remote(s) are capable of being transported easily for more convenience; a user may wish to place a Remote near a telephone (of any type) of the same extension that is connected to the answering machine, (the telephone being set up in any area such as outside, across the house, in another room, downstairs, etc.) enabling easy access to pick up the screened phone call should the user option to.

Because most modern telephone answering devices or machines are of the remote pick-up type (wherein the answering machine will revert to dormant status immediately upon pick-up of any telephone extension connected to the same line), transmission of the caller's voice to a Remote will also stop upon pick-up of any phone extension of the same line, in such that the user may then have a private conversation with the caller.

Depending on embodiment, the user may also manipulate any remote operational or function controls and/or recording controls that may be located on a Remote, enabling the user to access and/or operate an answering machine remotely with the Remote, from a neighboring area.

DESCRIPTION OF THE PREFERRED EMBODIMENTS

While this invention is susceptible of modifications, methods of operation, and embodiments in many different forms, there is shown in the drawings and will herein be described (in detail) some preferred modifications and embodiments of the invention with the understanding that the present disclosure is to be considered as an exemplification of the principles of the invention and is not intended to limit the broad aspect of the invention to the embodiments illustrated, and that changes may be made therein without departing from the scope of the invention.

The present invention allows for a Remote that is capable of interacting with a call receiving and storage device including call answering machine, service, device or message storage, allowing the user to (depending on embodiment):

a. conveniently hear and screen incoming calls remotely, through the Remote, without the caller knowing that he/she is being screened, and/or b. remotely operate his answering machine and its various functions through the Remote.

All possible from a remote area, or areas, away from or elsewhere from where an answering machine actually resides.

"Answering machine" is used in this text to mean any answering machine, service, answering device, or message storage center designed to receive and/or store messages.

In preferred embodiments, the Remotes are small in size.

FIG. 1A shows a possible embodiment of a basic Remote without "On/Off" switch or volume control switch, the Remote being "On" and audible as long as power source is available.

Figure 1B:
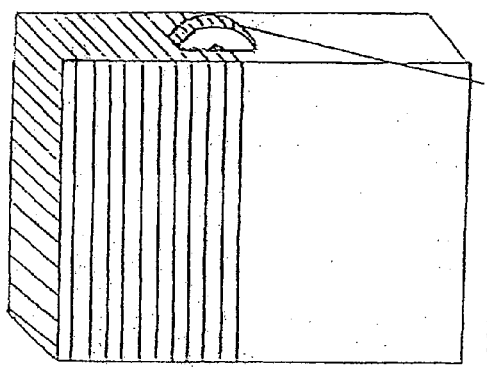

FIG. 1B shows another possible embodiment of a basic Remote that includes a volume control 220, the Remote being "On" as long as there is a power source available.

Figure 1C:
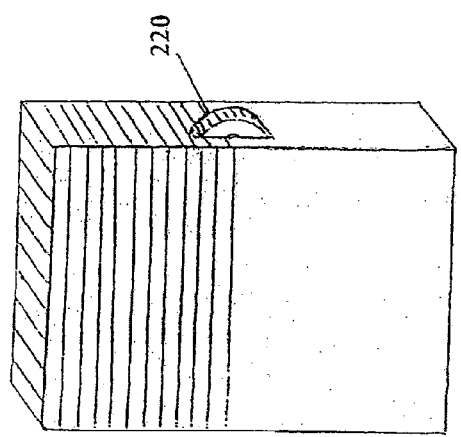
Figure 1D:
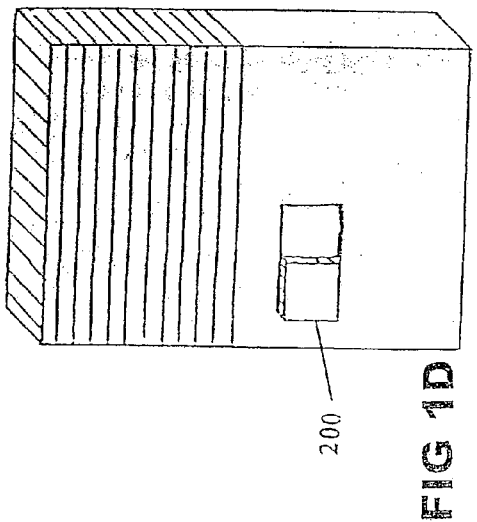
Figure 1E:
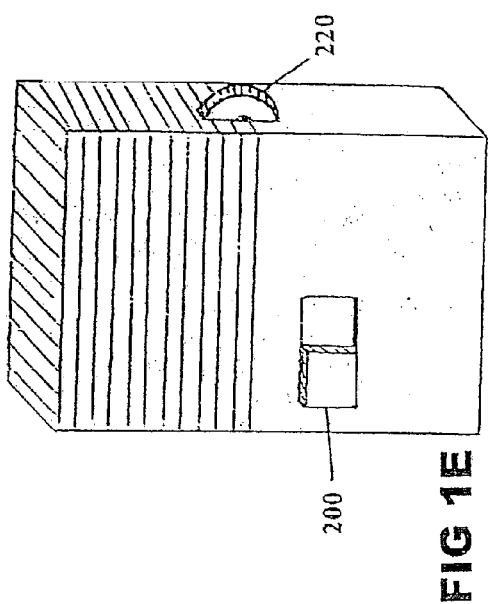

FIGS. 1C, 1D, and 1E show some of other possible embodiments of basic Remotes with variable "On/Off" and/or volume controls. FIG. 1C shows a possible embodiment of a Remote with a combined "On/Off" and volume controller 221. FIG. 1D shows a possible embodiment of a Remote with "On/Off" control 200, without a volume control, the Remote being audible as long as Remote is turned "On". FIG. 1E shows a possible embodiment of a Remote with separate "On/Off" 200 and volume 220 controls.

The following of some of many possible Remote features and functions are shown collectively in some drawings but are not restricted to such or any specific number or combination. They may be embodied alone, in many of any combinations, together in different combinations, and/or collectively together on a Remote unit.

Figure 2:
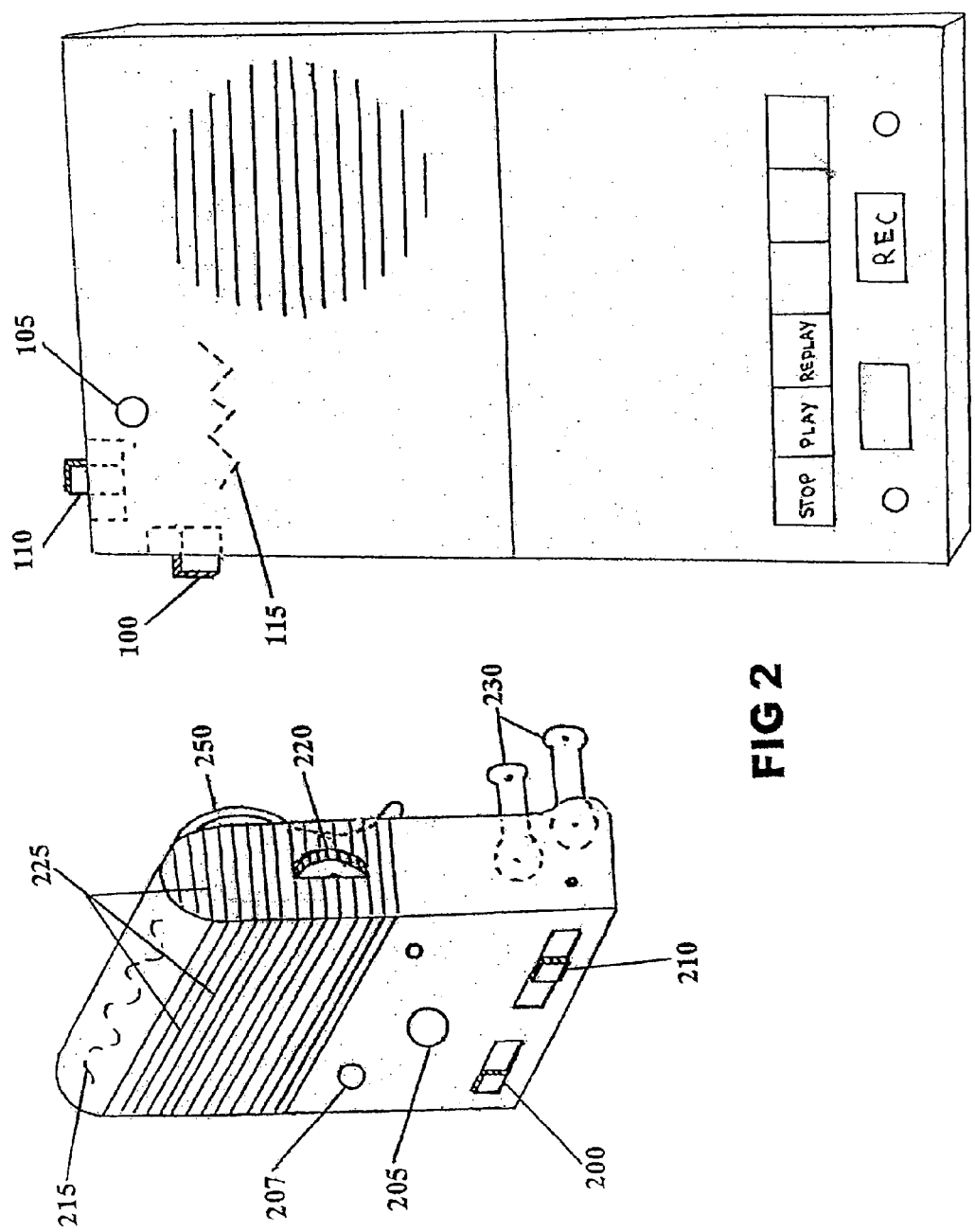
FIG. 2 shows a front perspective view of a possible Remote, with additional possible features, and FIG. 2 also shows an example of a possible telephone answering machine that embodies some possible additional features that may be used together with Remotes.

FIG. 2 shows a possible embodiment of a Remote with possible variable, additional features, and FIG. 2 also shows a possible embodiment of an answering machine unit with possible variable, additional features.

Figure 3A:
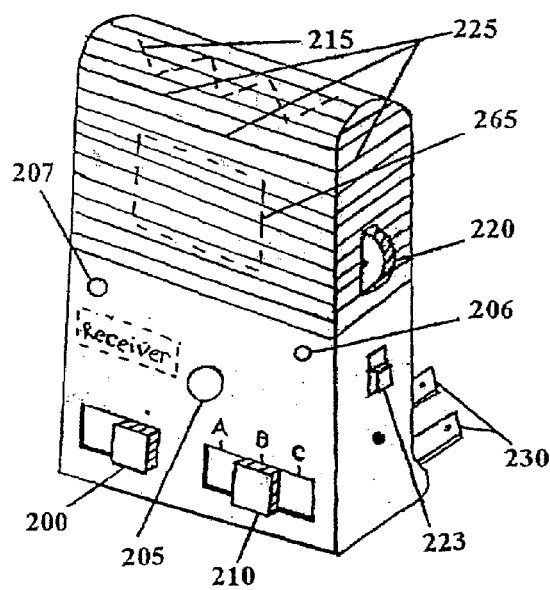
FIG. 3A shows another front perspective view of a possible Remote.

FIG. 3A shows another drawing of an embodiment of a Remote with some of many possible variable features.

In a preferred embodiment, the user may manipulate an ON/OFF control switch, dial, knob, button, etc. 200 (FIG. 3A) that regulates the control of the functional capabilities of a Remote. The user may turn the Remote ON or OFF at his convenience. The user has the option to leave the Remote in an ON (or active) mode, thereby enabling a constant receiving (screening) ability and/or the constant remote operational ability of an answering machine. For example, the user need not have to activate any actuator ("On" mechanism) per incoming call in order to hear (screen) that incoming call since, if the Remote is left "ON", the Remote will automatically emit the voice of the caller. The user has the option of leaving a Remote in an active (ON) mode, thereby eliminating any need to actively locate and physically be at a screening device in order to have to turn the screening capacity ON every time there is an incoming call (as is the case with the Scordato patent).

Embodiments of a Remote may include any number of indicator lights (LEDs, light emitting diodes). An LED 205 (FIG. 3A) can be used as an indicator for power, indicating Remote is ON (active), and/or as an indicator for distance, letting the user know when the Remote is out of range. This LED or any other one, example 206 (FIG. 3A), may also serve as a privacy indicator, letting the user know that someone else is accessing his previously recorded messages, that other person either accessing these messages at the answering machine itself, remotely by phone, by another Remote, etc. An LED, example 207 (FIG. 3A), can be used to indicate recharging of a Remote. Any LED can also be made to show how many messages have been left on an answering machine by blinking the corresponding number of messages.

The circuitry that enables these abilities are already known in the art.

Figure 3B:
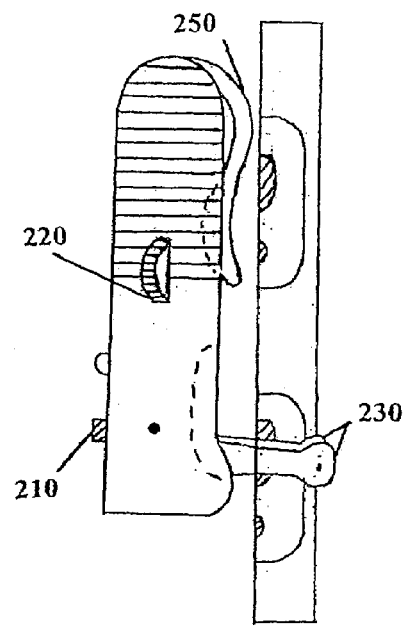
FIG. 3B shows a side view of a possible Remote shown in contact with an AC outlet.
Figure 3C:
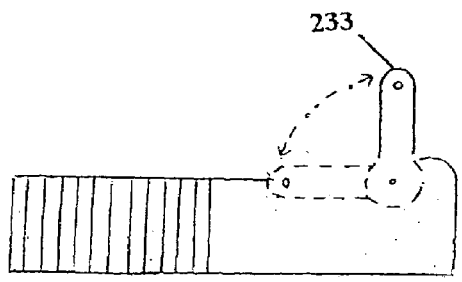
FIG. 3C is a side view of a possible Remote showing possible different pivotal positions of a possible collapsible or moveable AC prong.
Figure 6A:
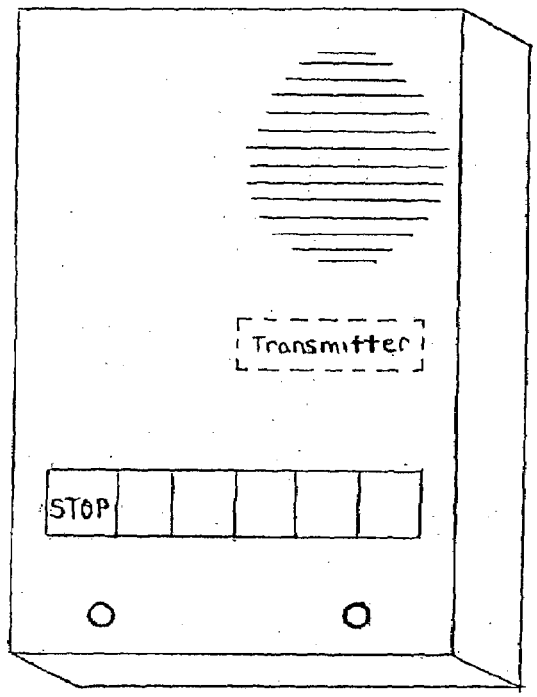
FIG. 6A shows a front elevation view of an example of a possible basic answering machine that can be used with a Remote.
Figure 6B:
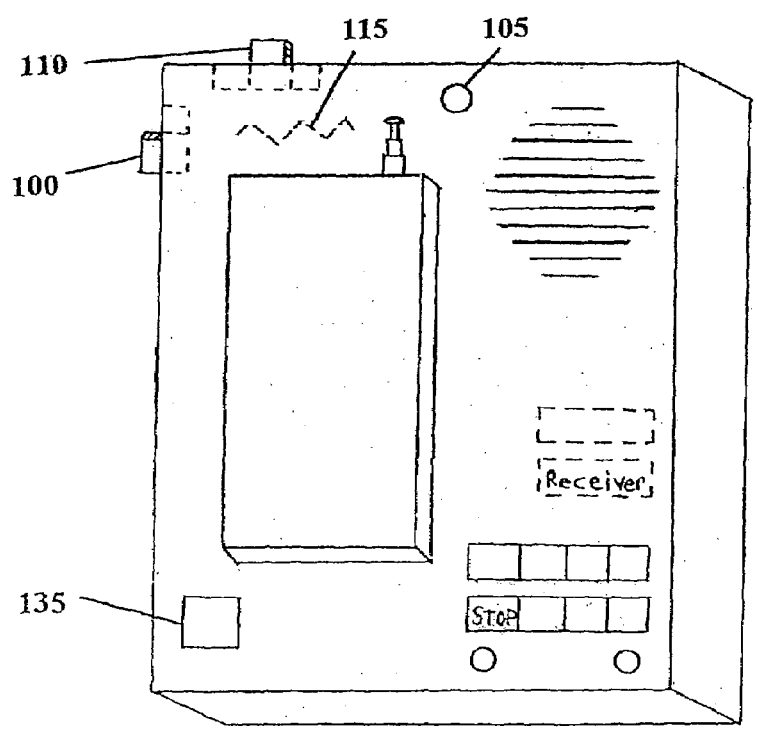
FIG. 6B shows a front elevation view of a possible answering machine that embodies possible additional variable features that can be used together with a Remote unit.

An embodiment of a Remote unit may include; automatic scanning and adjusting ability enabling a Remote to automatically scan and adjust over multiple channels or frequencies to best frequency reception, and/or an automatic channel select and scan control button or dial {example 208 (FIG. 3F)}, and/or may include a manipulable channel/frequency selector/switch {example 210 (FIG. 3A)} with which to be able to manipulably choose from certain multiple channels or frequencies. An answering machine may possibly also include multiple channels or frequencies: automatic, and/or manipulable, and/or selectable 110 (FIG. 6B).

Multiple channels or frequencies allow for e.g.:

a. best reception ability and/or b. so that, for example, other persons in that same household, business, or neighboring area, who may have their own personal answering machine and Remote(s) may be able to switch their own units (answering machine and/or Remote) to a non-interfering channel/frequency, and/or have a Remote that is capable of automatically scanning to clearest frequency.

An example of one kind of possible manipulable channel/frequency selector with a manipulable selector switch from which to choose from certain multiple frequencies or channels: Parents in a household set their answering machine and/or Remote(s) to the channel/frequency "A" (see 210, FIG. 3A), while their teenager, who has his own answering machine and/or Remote(s), sets his unit(s) to the channel/frequency "B", etc. thereby eliminating potential interference.

Another possible advantage: Remotes may be manufactured to be able to be used interchangeably, for example: to work in conjunction with either the parents' or teenager's answering machine unit, by matching-up channel/frequencies on the units, and/or, likewise, an answering machine unit may be manufactured to work interchangeably with either the parents' or teenager's Remote unit(s), by matching-up channel/frequencies. Another example for use of a manipulable channel/frequency selector/switch with which to be able to manipulably choose certain channels: The teenager, if given an instruction by his/her parents, may be able to listen for (screen) the parents' answering machine, from the convenience of the teenager's own room, for that specific, important call that the parents are waiting for that must be answered personally, This may be done by switching the frequency or channel of the teenager's own Remote unit from channel "B" to match that of his parents' answering machine unit or Remote, channel "A". This interchangeability would not affect the ability of the parents' answering machine's continuing regular functioning. This possible frequency/channel selector interchangeability between an answering machine and other Remotes allows (provides the consumer with) much versatility, convenience, and economy.

and/or c. an answering machine and its manufacturer accompanying Remote(s) can have factory predetermined matching "codes" so that signals are only sent to matching "coded" units, thereby eliminating potential interference with other answering machine and/or Remotes that may be within, for example, the same household or neighboring area. An embodiment of this nature can also be made with or without the ability to automatically scan and adjust frequencies or channels; with or without automatic select and scan button; with or without manipulable channel/frequency selector/switch option. Inclusion of channel/frequency selection, automatic or otherwise, on either of, or both, an answering machine and/or Remote(s) in an embodiment of this nature, can still be a useful tool for the user to obtain optimum reception, privacy and/or versatility.

If there is a predetermined matching "code" between an answering machine and its Remote(s), the factory can include any plurality of matching "coded" Remote to accompany the answering machine unit in its manufacturer packaging. Allowing more than one matching "coded" Remote to accompany an answering machine, thereby conveniently allows the consumer numerous possible variable and simultaneous placements of more than one Remote at a time. And depending on how many Remotes that may be packaged together with an answering machine unit, this also provides the consumer with choice of economy.

Embodiments of an answering machine and Remotes that do not include a factory predetermined matching "code" between the answering machine and the Remote(s), allows for the consumer, at his own discretion, the possible later date purchasing of numerous, additional Remotes that, again, can be used in numerous, convenient, variable placements and locations, simultaneously.

Remotes can be manufactured to be programmable for use with answering machines, so, for example, in the case where a "code" is needed or there is a predetermined matching "code" between answering machine and Remote units already purchased, additional Remotes can be purchased later and programmed to match the "code" of the answering machine unit.

Remotes can be manufactured in different ways to work or interact with answering machines, including: being manipulable, and/or being pre-manufactured, and/or being programmable, to work with answering machines.

The circuitry that allows such abilities is already known in the art.

Figure 4A:
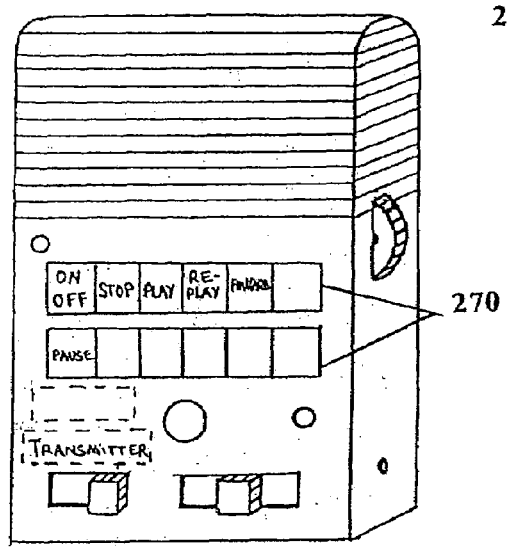
FIG. 4A and FIG. 4B show front perspective views of possible Remotes showing some possible embodiments that include additional remote operational or remote control function(s) and feature(s) that are usable with an answering machine.

A possible embodiment of a Remote may include the ability to remotely operate and access an answering machine. A Remote embodiment having function controls, example including such as some shown collectively 270 (FIG. 4A), and capabilities to remotely operate an answering machine's possible numerous, variable functions, including such as: on/off, stop, play, replay, forward, back, listen, pause, etc. from a Remote, with necessary remote function controls located on a Remote. Some of these functions allow a user to remotely screen or listen to previously recorded calls externally audibly through a Remote. Remote operational or remote control access to an answering machine that may be, for example, located in one room upstairs while the user is downstairs in the kitchen, allows the user the ability to access the upstairs answering machine, listen to previously recorded messages left from callers, leave new outgoing messages on the answering machine, etc. all from the convenience of the downstairs room where he is now at presently.

And the Remote being externally audible allows all members of e.g. a family the opportunity to all be able to hear the calls that were left on the answering machine, eliminating any need for each family member from having to take turns to each individually pick up a screening receiver in order to have to put the receiver up to their own ears, activate the proper switch, and only then being able to listen to the calls (as would be the case with the Scordato patent).

This remote accessibility to an answering machine affords the user convenience in his everyday life.

The circuitry for remote operation is generally well known in the art.

Figure 4B:
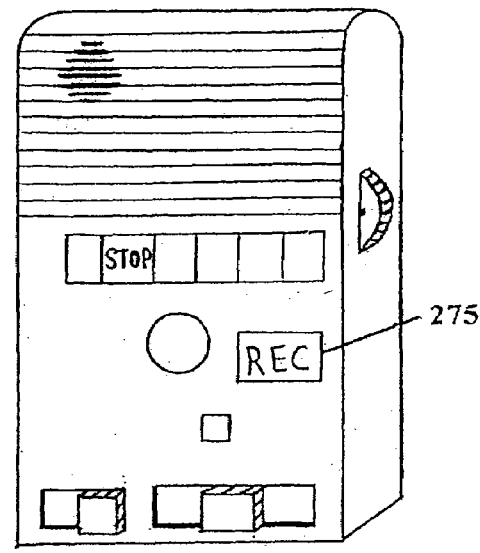

A possible embodiment of a Remote may include the capability to remotely record onto an answering machine from a Remote, with microphone 280 (FIG. 4B) and record control button/switch 275 (FIG. 4B). The circuitry for such is generally well known in the art. This remote recording function could be used for such as remotely recording outgoing announcements on an answering machine, and/or for leaving "memo" messages on an answering machine from, for example, another room in the house.

An embodiment of a Remote can be manufactured so that the user can hear a telephone's ring, or some kind of alarm signal, through a Remote without having to be near or within earshot of a telephone's ring. This can provide for, if, by chance, the user has his telephone ringer off or can't hear his telephone ringer, the user, hearing the ringing signal from a Remote, will still be alert to the fact that a call is about to come through so that he may then listen (screen) through his Remote. If an embodiment of a Remote exists that does include a ringing signal, that embodiment might also include a switch to turn that Remote's ringing signal OFF or ON 223 (FIG. 3A).

An embodiment of a Remote may have any LED light up or flash in conjunction with a ringing signal or instead of a ringing signal. A lit or flashing LED would be an extra alert in case a user cannot hear a ringing signal from a Remote due to external noise. Depending on embodiment, if the user has opted to turn OFF the ringer switch on a Remote, he may still be able to be alerted that an incoming telephone call is coming through, being made aware by a lit or flashing LED.

A Remote may include an antenna for optimum reception and/or transmission of received and/or transmitted signals. A Remote's antenna may be manufactured: internally 215 (e.g. FIG. 3A) within the housing of a unit or have a conventional external antenna (not shown).

The use of antennas, internal or external, is already known in the art.

An embodiment of a Remote may include a volume control, example 220 (FIG. 3A) that may be adjusted in response to signals received from an answering machine, whereby the audible sound coming from a Remote may be adjusted higher or lower.

Figure 3D:
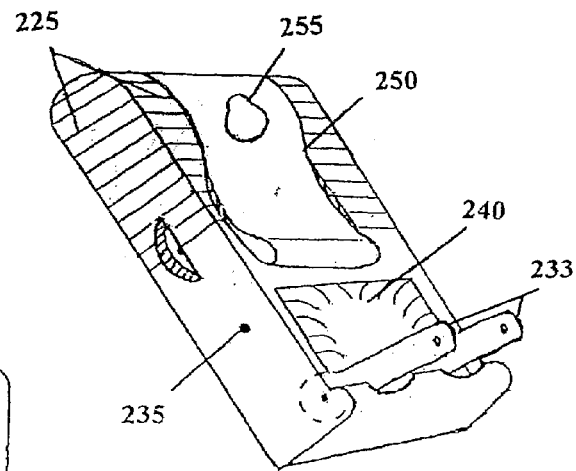
FIG. 3D is a rear perspective view of a possible Remote showing a possible surrounding audio speaker vent or grill and also showing a possible sunken recess portion for a possible collapsible AC prong when in collapsed state.

FIGS. 3A and 3D show possible embodiments of Remotes with audio venting or grill 225, with preferred embodiment having audio venting that surrounds a Remote unit for optimum sound emission in all directions. This allows for a Remote to be placed at any angle with an ability to transmit externally audible sound in all directions.

Audible sound emitted from a Remote could be a caller's voice, incoming and/or recorded, and/or a telephone ringing sound, depending on embodiment.

Figure 3E:
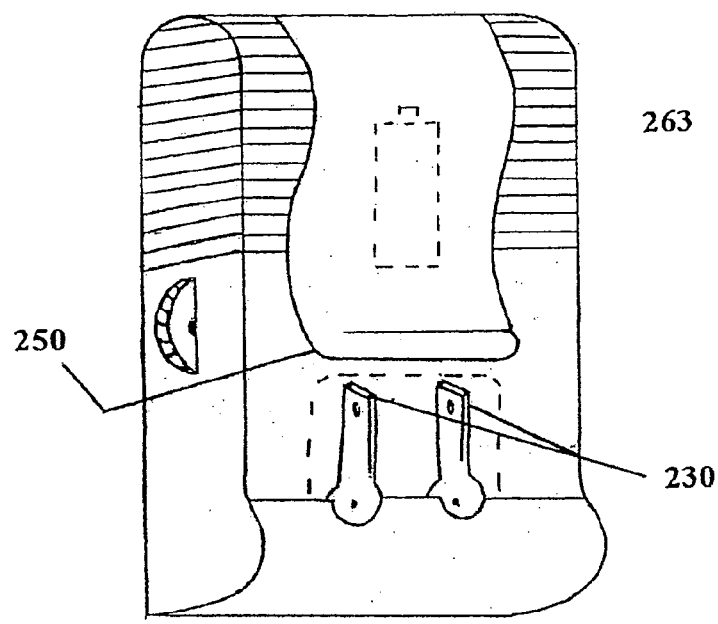
FIG. 3E is a rear perspective view of a possible Remote showing a possible belt clip and also showing a possible AC prong in a collapsed state.
Figure 3F:
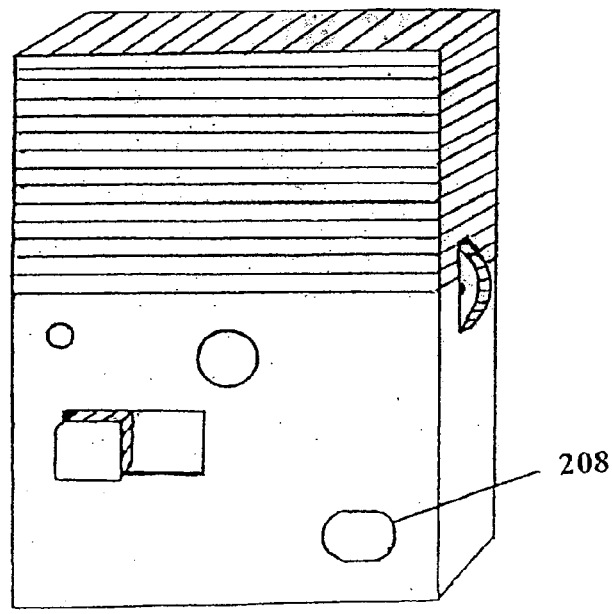
FIG. 3F shows a possible Remote embodiment that includes a channel select/scan button.

FIG. 3B shows a possible embodiment of a Remote that includes a connector prong or plug 230, shown here in contact with an AC outlet. FIG. 3C shows a possible embodiment of a Remote with a collapsible, moveable, fold-out, or pivotal prong 233. FIG. 3D shows a rear perspective view of a possible embodiment of a Remote that includes a possible recessed area 240 for a possible collapsible, prong. A recessed area may allow for a greater ability for a collapsible, retractable, moveable, fold-out, or pivotal prong in its collapsed or retracted state to lay flush or almost flush with the housing of a Remote. A possible example of how this may work is shown in FIGS. 3C and 3E, though this feature may be embodied in many different ways. A collapsible or moveable prong allows for greater ease of portability of a Remote.

Figure 5A:
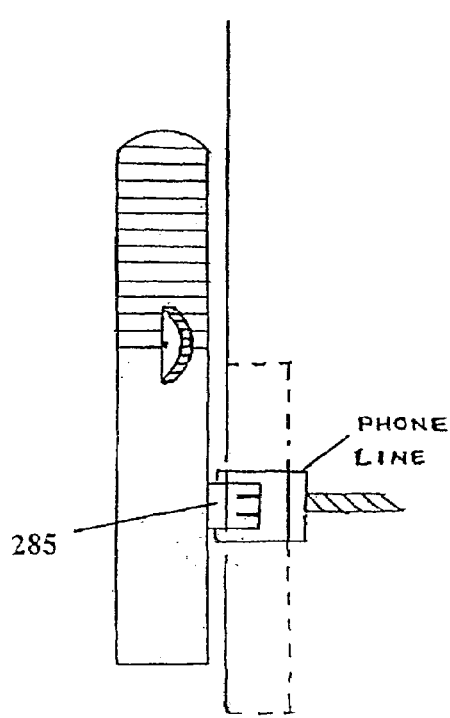
FIG. 5A shows a side view of a possible Remote that includes a possible phone jack connector prong shown in contact with a phone line outlet.

FIG. 5A shows an embodiment of a Remote that is powered and/or given access to a phone line (and/or answering machine) by connection to a phone line outlet or phone jack by a phone line, or phone jack connector prong 285.

The necessary components to enable a unit to be powered by and/or interact with a phone line are known in the art.

Figure 5B:
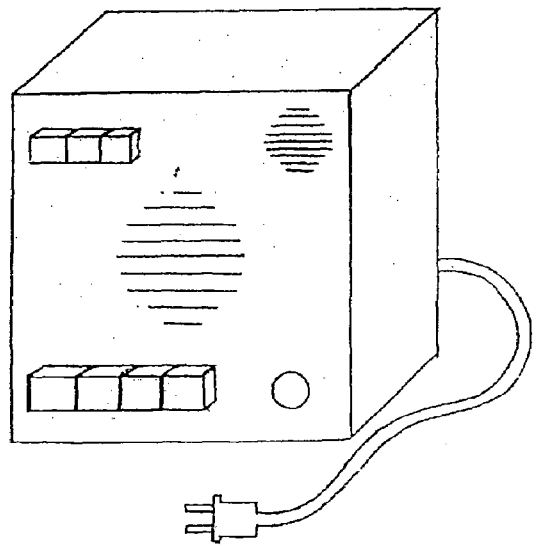
FIG. 5B shows a perspective view of a possible Remote and also includes a possible corded AC prong.

FIG. 5B shows a possible embodiment of a Remote and also possible inclusion of a corded AC prong 234.

Having a connector prong, plug, or phone connector prong allows for accessibility to a constant source of power. This power source can provide for actual operational usage of a Remote and, depending on embodiment, can also provide for recharging a possible rechargeable power supply or component 265 (FIG. 3A) located within a Remote.

Rechargeable components are already known in the art of such.

Having a rechargeable component within a Remote allows the Remote to be powered alternately between the main power source and the rechargeable component. This allows the user to remove the Remote from the AC or other power source, allowing the Remote to be powered by the rechargeable component, without forfeit of remote operational and/or screening abilities. Rechargeability also yields, or gives forth to, greater portability and use for the Remote, such that a Remote unit can be moved from place to place and it need not be limited to any stationary position for its source of power.

A rechargeable component may be of any kind, including electrical or digital. A rechargeable component may also include rechargeable battery(ies).

The use of a Remote that includes a connector prong for an AC (or other power) outlet can provide a Remote with, depending on embodiment, operating power and recharging power alternately, OR operating power and recharging power simultaneously so that operating usage can be indefinite even while recharging. By providing a connector prong, a Remote doesn't need recharging in any "home base unit", as a Remote with a connector prong can have available a constant source of convenient available power either by direct power source, including such as that of convenient AC outlets and/or phone jack outlets, and/or depending on embodiment: a rechargeable component or standard battery(ies) 263 (FIG. 3E). Thereby a Remote is more capable of being consistently usable and capable of constantly being in more convenient, accessible locations other than in some bulky, stationary "home base" recharger unit that may be located in some remote part of the user's home.

Just leaving the Remote plugged into or connected to its power source and ON enables the user to not have to physically be at the Remote during each telephone call in order to have to activate it, since by leaving it ON, it is already pre-activated. A Remote can be pre-activated (left ON) no matter how it is powered, including such as being plugged into its power source, powered by rechargeable component, or powered by standard battery(ies), enabling the user to not have to physically be at the Remote unit per phone call in order to have to activate it.

A Remote embodiment may include the ability to be powered by standard battery(ies) alone or alternately between main power source and standard battery(ies).

An embodiment of a Remote may include an adapter outlet 235 (FIG. 3D) for receiving power from an adapter source.

FIGS. 3B and 3D show examples of embodiments of possible Remotes that may include a clip member or belt clip 250. A clip member can allow for the ease of a Remote to be placed or attached upon different support structures including such as a belt, pocket, or edge, for easy transportation or placement location.

FIG. 3D shows a possible embodiment of a Remote with a possible inclusion of an aperture or notch 255 whereby a Remote may be hung from a fastener extending from a surface such as a wall.

Figure 7A:
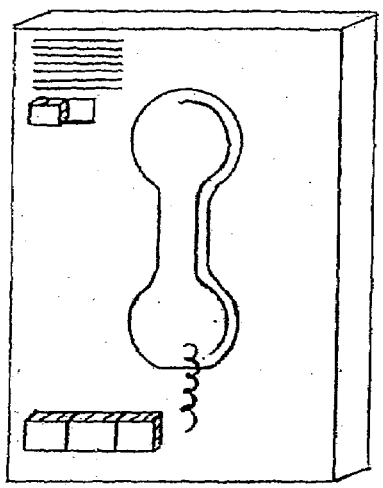
FIG. 7A shows possible embodiment of Remote included within telephone base/cradle.
Figure 7B:
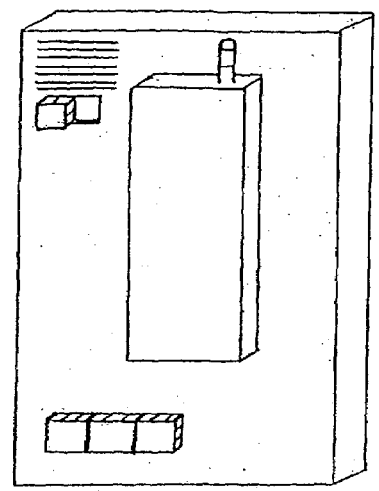
FIG. 7B shows possible embodiment of Remote included within phone recharger/base unit/cradle.

Another possible embodiment would be for any and/or all the function(s) and capabilities of a Remote to be housed within a telephone (of any kind) receiver's base unit, cradle, or recharger unit, (FIGS. 7A and 7B), and equipping these units with external loudspeaker, enabling these units with the capability to (externally) audibly screen incoming and/or recorded calls, and/or remotely operate an answering machine.

Figure 8:
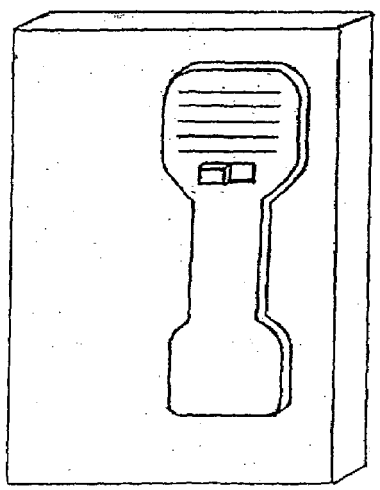
FIG. 8 shows possible embodiment of Remote included within a phone handset (receiver).

Another possible embodiment would be for any and/or all the functions and capabilities of a Remote to be housed within a telephone's receiver housing (any kind of telephone receiver, including cordless), for example, equipping the handset or receiver with an external audible receiving loud speaker, (separate from that of the normal audio receiver of the telephone), for audibly external screening use, so that the user may, for example, set his telephone handset down anywhere, including its cradle/base, and screen his calls, through the telephone handset or receiver, from across a room or (depending on embodiment, if the telephone receiver is cordless) carry the telephone handset with him and still have convenient access to screening his answering machine's calls through the telephone handset and, of course, as an added bonus, be near the telephone handset should he decide that he wants to talk to the caller (FIG. 8).

Figure 9:
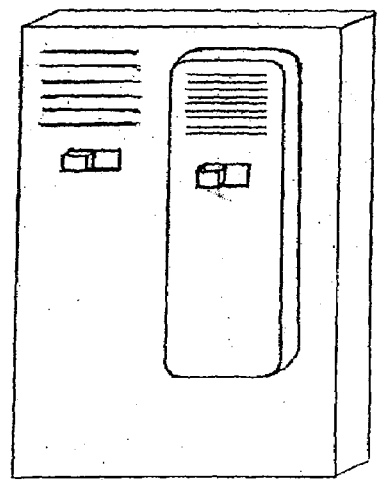
FIG. 9 shows possible embodiment of Remote included within both phone base and a phone handset (receiver).

Another possible embodiment would be for any and/or all the functions and capabilities of a Remote to be housed within both a telephone handset or receiver housing (of any type of telephone) and also the housing of its cradle, base, or recharger unit (FIG. 9).

Any and/or all functions and capabilities of a Remote may be housed within any type of unit, including such as a TV set (FIG. 10), any part of a computer set (FIG. 11), analog, digital or cellular phone (FIG. 12), car phone, etc.

Figure 13:
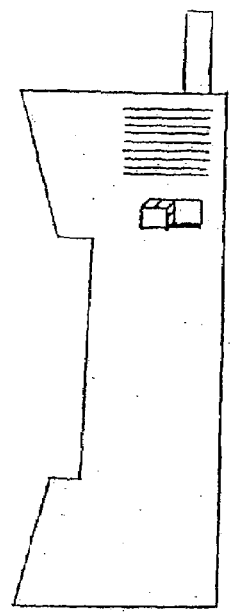
FIG. 13 shows a side view of a possible embodiment of Remote included within a cordless receiver showing possible audio speaker venting and also showing possible "On/Off" control.

An embodiment of a Remote that is included within the housing of a cordless receiver or any type of cordless phone may include audio speaker venting and also may include ON/OFF control in regards to screening ability (FIG. 13). The unit is able to externally audibly screen calls from an answering machine through the audio speaker venting.

Figure 14:
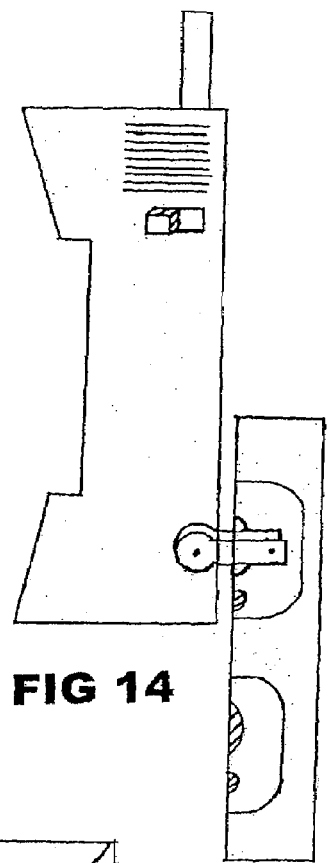
FIG. 14 shows a side view of a possible embodiment of Remote included within a cordless receiver showing possible AC prong, preferably collapsible, in contact with an AC outlet and also showing possible audio speaker venting and also showing "On/Off" control.

An embodiment of a Remote that is included within the housing of a cordless receiver or any type of cordless phone may include a possible AC prong (FIG. 14), preferably collapsible, shown here in contact with an AC outlet.

Figure 15:
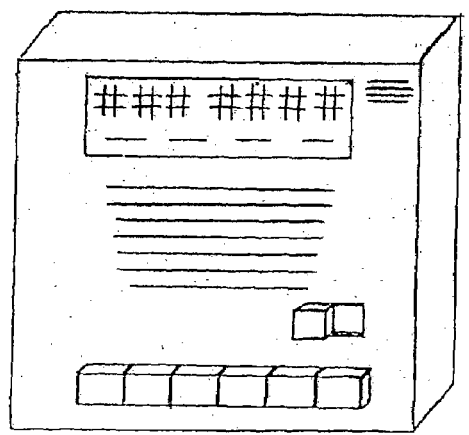
FIG. 15 shows a possible embodiment of a Remote that includes Caller ID.

A Remote may also include a Caller ID display or vice-versa. Any embodiment of a Remote can also incorporate or include a Caller ID display or function, example (FIG. 15). Conversely, the audible screening functions and/or other remote control functions of a Remote can also be incorporated into any embodiment of a Caller ID unit or any embodiment that includes Caller ID. And any Remote function or capability can be used in conjunction with any Caller ID function.

Any Remote embodiment may include an On/Off switch to control the externally audible screening loudspeaker (examples include: 200 (FIGS. 1D, 4B, 13) and 221 (FIG. 1C). The switch can be left in an "ON" mode at the user's option, leaving the screening capabilities "ON", which would enable the user to be able to hear and screen the incoming message or caller from a nearby area, such as across a room, without necessitating that a user have to get up and/or physically be at the phone receiver in order to have to depress or activate any type of code, button, or switch. Having an On switch that is able to stay "ON" and enables the screening ability to stay "ON", eliminates any need for such as that just mentioned.

In an embodiment where the Remote is portable, a Remote unit may include any number of possible attachment methods or sources.

Possible placement of a Remote unit could be anywhere, attached or otherwise, including being placed next to or on the side of any computer, or telephone, etc. for convenience.

These and other examples of Remote embodiments make for functioning remote units, devices, or capabilities which can include screening abilities and/or screening abilities with remote operational or remote control abilities, with which an answering machine has the ability to support and interact on such and each function.

The necessary components or circuitry for processing and carrying out the signals and commands between a main unit and its remote control counterpart unit(s) are known in the art of such. The necessary circuitry or components for processing and carrying out the signals and commands for remote operation capabilities between units is generally well known in the art. The necessary components or circuitry for receiving, represented in FIGS. 3A and 6B by a labeled rectangular box, is well known in the art. The necessary components or circuitry for transmitting, represented in FIGS. 4A and 6A by a labeled rectangular box, is well known in the art. The necessary components or circuitry for enabling two-way transmitting and receiving abilities between units are known in the art. The necessary components or circuitry to carry out wireless interaction between units are known in the art. The circuitry or components used in the present invention to allow for interaction between units is generally well known in the art. The necessary circuitry or components for processing and amplifying signals is generally well known in the art.

The features, functions, and capabilities of a Remote can be implemented and/or included into any embodiment, whether it is a self-contained Remote unit, or the features, functions, and/or capabilities of a Remote are housed within any other type of apparatus, unit, or device. The features, functions, and capabilities of a Remote may be embodied in any housing and in any number or combination.

"Answering machine" is used in this text to mean any answering machine, answering device, or message storage center designed to take and/or hold callers' messages.

An answering machine may be singularly by itself, may be combined with or into other functions or devices, and/or may be implemented into other devices.

An answering device may be any machine, device, service, center, or process that takes and/or holds callers' messages.

An answering machine may accommodate any variety of mode changes, signals, functions, and features. An answering machine may include being singularly by itself, may include a portable handset receiver, may be incorporated into any other type of unit, etc.

An embodiment of an answering machine may be of any form. It may be basic, such as the example illustrated in FIG. 6A, or may be of a more complicated nature and involve any additional features. The features, functions, and capabilities of an answering machine can be implemented and/or included into any embodiment, whether it be a self-contained unit, or the features, functions, and capabilities of an answering machine (in any number or combination) are housed within any other type of apparatus, machine, unit, or device, including such as those mentioned earlier for Remotes.

The following of some of many possible answering machine features are described and/or shown collectively in some drawings but are not restricted to such or any specific number, combination, or housing. They may be embodied alone, in many of any combinations, together in different combinations, and/or collectively together.

A possible embodiment of an answering machine may include multiple channels or frequencies that may, depending on embodiment, automatically scan and adjust to best frequency for use with Remotes, and/or may include a manipulable channel/frequency selector/switch, located on an answering machine 110 (FIG. 6B), for uses such as those described earlier for Remotes.

FIG. 6B shows a possible embodiment of an answering machine that includes such possible variable features such as a manipulable On/Off Remote-override switch 100. A Remote-override switch on an answering machine can provide an override to any power or remote control functions and/or screening functions to or from a Remote. Turning Off a Remote-override switch allows the user to shut down (turn Off) any interaction between an answering machine and Remote(s) without the user having to turn Off an answering machine's own On/Off control switch. The added control of a Remote-override feature thereby provides the user with ultimate control with concerns to his privacy in regards to any unauthorized screening or manipulation of his answering machine by or through a Remote. Manipulating a Remote-override switch that may be embodied on an answering machine does not interfere with the operable use of an answering machine's capabilities and functions.

FIG. 6B shows a possible embodiment of an answering machine that may include any number of indicator light LEDs (light emitting diodes), possibly including an LED 105 for such use as to indicate to the user that the capabilities to interact with a Remote are either On (example: lit) or Off (example: not lit). An LED could also, depending on embodiment, be used as an indicator, by being lit or by flashing, that someone is accessing an answering machine by way of Remote.

The interaction capabilities between an answering machine and Remote(s) are preferably such that a sizable range of distance is attainable. A sizeable range of distance leads to convenience and, e.g., helps to accommodate large homes, places of business, and/or possible outdoor placement of Remote(s).

The circuitry used in the present invention to allow for such interaction between units is generally well known in the art.

An embodiment of an answering machine may include an internal (or external) antenna 115 (FIGS. 2 and 6B) to enhance distance, and/or sound, and/or frequency.

A preferred embodiment of an answering machine would be for its audible transmitting capabilities to Remotes to be independent of an answering machine unit's own regular volume control. With highly sensitive microphone/transmitting signals, of which the circuitry components used for processing such are generally well known in the art of transmittance, an answering machine may pick up and transmit a caller's voice to a Remote even though the answering machine unit's own volume level may be turned down low or to its lowest setting with no ill effect on the audible transmission of sound to Remote(s), which, depending on embodiment, may also have their own independent volume control. This allows the user the option to keep the volume of the answering machine "low" or "off" in the room or area where it is located, allowing a user to have quietness in this room or area, yet still be able to keep audible transmitting abilities to the Remote(s). For example, if one person wants to take a nap in his bedroom and the answering machine happens to be located in that bedroom, he can turn down the volume of his answering machine so that he will not be awakened by any calls coming through the answering machine, still keeping the audible transmitting abilities so that others in the same household can still be able to screen their calls by way of Remote(s) that are placed or being kept in other rooms of the house.

An embodiment of an answering machine unit may include a Remote locator button/call switch 135 (FIG. 6B) which, when activated, will signal an alarm sound in the Remote(s) should the user be unable to locate the Remote. One or any possible LED in a Remote may also blink or light up in response to the activation of the Remote locator button. The user will then have no trouble finding the Remote(s) if they happen to have been misplaced or if he has forgotten where he placed it/them.

An answering machine may be manufactured to be programmable for use with Remotes or accept programmable Remotes. This could, in the case where a "code" is needed, or there is a predetermined matching "code" between (answering machine and Remotes) units already purchased, also accommodate for the purchase and use of Remotes or additional Remotes (that then can be programmed to match the "code" of the already purchased answering machine), at a later date than the original purchase of the answering machine.

Answering machines may be manufactured in different ways to work or interact with Remotes, including: being manipulable, and/or being pre-manufactured to work with Remote, and/or being programmable to work with Remotes.

The necessary circuitry to enable these embodiments is generally well known in the art.

Figure 16:
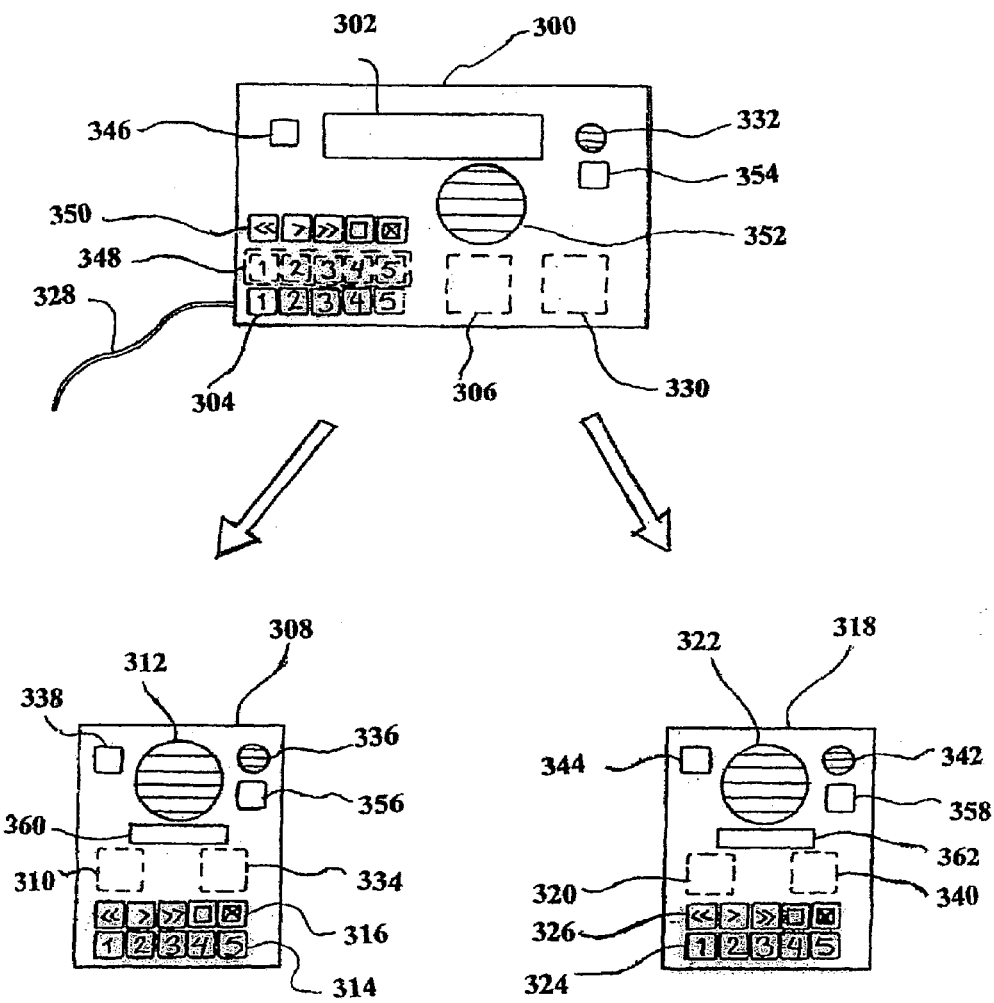
FIG. 16 shows a remote call screening system including an answering machine with multiple "mailboxes" for storing voice messages and multiple Remote units for monitoring incoming messages and for replaying previously recorded messages.

FIG. 16 shows a remote call screening system including an answering machine or system 300 with multiple "mailboxes" 348 for storing messages and multiple Remote units 308, 318 for monitoring incoming messages and for replaying previously recorded messages. This embodiment of the present invention is particularly useful for households or offices with multiple users of the remote call screening system. In addition, it facilitates the use of one remote call screening system for multiple uses at one location, for example for using one telephone system for screening both home office and household phone calls. Calls forwarded from other locations can also be screened using the same remote call screening device. The features of this embodiment of the invention may be combined with any of the features of any of the embodiments previously described. The answering machine 300 connects to an incoming telephone line 328, which may be configured to include a single telephone line, two telephone lines or multiple telephone lines. The answering machine 300 may be connected with one or more telephones (not shown), either directly or using wireless connections. Alternatively, one or more standard or cordless telephones may be built into the answering machine 300 and/or into the Remote units 308, 318.

The answering machine 300 is configured with multiple "mailboxes" 348 for receiving and storing voice messages. The multiple "mailboxes" 348 may be accomplished by segregating recorded messages within a recording or storage device, such as an analog or digital electronic storage device, for example a random access memory (RAM), recordable CD ROM or DVD, or flash memory device. Alternatively, multiple "mailboxes" 348 may be implemented using tape recording devices, such as by using a separate cassette or microcassette recorder for each of the "mailboxes" 348. Any number of "mailboxes" 348 may be implemented. In the exemplary embodiment of FIG. 16, the answering machine 300 is shown with five "mailboxes" 348. Preferably, the answering machine 300 includes operational controls 350 for operating the answering machine and a speaker 352 for listening to recorded messages as well as for monitoring incoming calls. In addition, the answering machine 300 includes a microphone 332 and a record button 354 for recording a greeting, outgoing message or memo in the answering machine 300. The microphone 332 may also be used for intercom communications with the Remote units.

The answering machine 300 automatically answers each incoming call. A prerecorded greeting or outgoing message on the answering machine 300 directs callers to select their choice of "mailboxes" 348 by indicating a number or a name using the keypad of their phone or a computer or other device or by voice commands. The answering machine 300 then directs the incoming call to the selected "mailbox" 348. In addition, a separate prerecorded greeting or outgoing message may be associated with each of the "mailboxes" 348. The "mailboxes" 348 may each be assigned to a different user or to a different purpose, such as to separate household phone calls from office or business phone calls. For this description, the multiple "mailboxes" 348 will be referred to nominally as "mailbox 1", "mailbox 2", etc. Preferably, the answering machine 300 includes a visual display, such as an LED display 302, to indicate the operating status of the answering machine 300 and how many messages are recorded in each "mailbox" 348, as well as to show which "mailbox" the incoming call is being routed to. It may also identify the intended recipient by name or other designation. In addition, the answering machine 300 may include a caller identification feature, which may shown the caller's phone number and/or name or organization on the visual display 302.

Simultaneously, as the incoming call is being recorded, a transmitter 306 in the answering machine 300 transmits the incoming call to one or more Remote units. (Additional transmitters 306 may be included to allow simultaneous transmission of more than one incoming message when the answering machine 300 is configured to operate with multiple incoming telephone lines 328 or with multiple calls multiplexed on a single incoming phone line or fiberoptic cable. Optionally, multiple receivers 330 may be included in the answering machine 300 to allow simultaneous reception of transmissions from multiple Remote units. The system can also be configured to screen incoming calls while engaged on another telephone call, for example in order to prioritize the calls. In addition, the system can be configured to screen calls while the line is otherwise engaged, such as while the line is being occupied by an internet connection. This can provide an audible call waiting function, which can supplement a caller identification feature.) For illustrative purposes, the system of FIG. 16 is shown with a first Remote unit 308 and a second Remote unit 318. The system may include multiple additional Remote units for multiple users. Each of the Remote units 308, 318 has a receiver 310, 320, which is configured to receive messages on one or more selected channels or frequencies. Optionally, multiple receivers 310 may be included in the Remote units 308, 318 to allow simultaneous reception of transmissions from multiple answering machines. Preferably, each Remote unit 308, 318 includes remote channel selector switches 314, 324 that allows each of the users to select which of the "mailboxes" 348 their Remote unit will monitor (e.g. "mailbox 1", "mailbox 2", "mailboxes 1 and 2", etc.) Alternatively or additionally the answering machine 300 may include answering machine channel selector switches 304 or other means for selecting or programming which Remote unit will receive incoming calls for which "mailbox" on the answering machine 300. Preferably, the answering machine 300 also includes a mode selector switch 346, which may include a remote function ON/OFF switch and a remote-override function for preventing transmission of incoming messages to one or more of the Remote units 308, 318 and/or from one or more of the "mailboxes".

Each of the Remote units 308, 318 is configured with a speaker 312, 322 for audibly emitting each incoming call as it is being recorded by the answering machine 300. This allows each user to monitor and screen incoming calls to the selected "mailboxes" 348 as they are being received. Optionally, the Remote units may also include a visual display 360, 362 for displaying such information as a caller identification feature, the operating mode, how many messages are in the selected "mailboxes" 348, which "mailbox" the incoming call is being routed to, etc. If one of the users chooses to answer an incoming call, he or she may interrupt the answering machine 300 by picking up a telephone (not shown) on the answering machine 300, on one of the Remote units 308, 318 or connected to the incoming telephone line 328. Other devices, e.g. a computer or a web or internet interface device, may also be used to answer an incoming call or message and interrupt the answering machine 300.

Optionally, one or more of the Remote units 308, 318 may include remote operational controls 316, 326 for remotely operating the answering machine 300, to play back recorded messages from one or more of the "mailboxes" 348 or to change its operating modes. In addition, the Remote units 308, 318 may also include a microphone 336, 342 and recording switch 356, 358 to record messages in one of the "mailboxes" 348, to record memos or outgoing messages, and/or for intercom communications with the answering machine 300 or another Remote unit, etc. In such case, the Remote units 308, 318 will each be configured to include a transmitter 334, 340 and the answering machine 300 will include a receiver 330 to permit two-way communication between the Remote units 308, 318 and the answering machine 300. Preferably, each of the Remote units 308, 318 also includes a mode selector switch 338, 344, for selecting the call screening function between OFF, ON and ACTIVE ON modes. The mode selector switch 338, 344 may also includes a remote-override function for preventing transmission of incoming messages to one or more of the Remote units 308, 318. Alternatively, the remote-override function may be implemented with a separate switch. Additional controls may include a power switch, volume control, etc.

In an alternative embodiment of the system, each of the Remote units may be preconfigured to receive incoming and recorded messages only on one or more preselected channels or frequencies or otherwise programmed to receive incoming and recorded messages from and/or to transmit to one or more preselected "mailboxes". In another alternative embodiment of the system, some of the Remote units may be preconfigured to receive incoming and recorded messages only from one or more preselected "mailboxes" and one or more "master" Remote units may be configured to allow a parent, employer or system administrator to monitor any and all of the "mailboxes" 348. Each of the "mailboxes" may include an access code or personal identification number for security and to prevent unauthorized listening to messages in individual "mailboxes" from the Remote units and/or the answering machine. If desired, the "master" Remote unit may include a master remote-override switch or a "privacy" control to prevent sensitive messages from being monitored or played back by some or all Remote units. The remote-override switches may be activated ahead of time to prevent all calls from being monitored on one or more channels, or it may be activated by the user at the moment privacy is desired.

The system of FIG. 16 may be made expandable to accommodate additional "mailboxes" and Remote units. For security, the answering machine and each of the Remote units may be provided with a "family code" so that only devices with a matching "family code" will operate with them. When new or other Remote units are added to the system, they may be programmed with the matching "family code" so that they will operate with the rest of the system.

FIG. 17 shows an embodiment of the present invention which is in the form of an integrated device 400 that combines the functions of a cordless telephone receiver with those of an answering machine and call screening Remote unit. The integrated device 400 includes a handset 402 and a base unit 404. FIG. 18 shows a rear view of the handset 402 of FIG. 17. The base unit 404 includes a telephone line 406, a transmitter 410, a receiver 412 and an antenna 416 for receiving incoming telephone calls and communicating them to the handset 402. Preferably, the base unit 404 also includes a power cord 408, a transformer 418 and an electrical connector 414 for recharging the handset 402.

The handset 402 includes a speaker 420, a loudspeaker 421 a microphone 422, a numeric keypad 424, a transmitter 428, a receiver 438 and an antenna 436 for functioning as a cordless telephone and communicating with the base unit 404. In addition, the handset 402 includes a telephone answering device 440 that includes a recording device, such as a flash memory or similar components for recording incoming and outgoing messages. A rechargeable battery 432 powers the handset. A power connector 444 connects the battery 432 to the transformer 418 for recharging when the handset 402 is rested on the base unit 404. Alternatively, the transformer 418 and a retractable power plug 442 or other power connector can be integrated with the battery 432 in the handset 402. Operational controls 430 are provided for operating the telephone answering device 440 to play back recorded messages and all answering machine capabilities. Optionally, the telephone answering device 440 may include multiple "mailboxes" for storing incoming messages, as described above. The telephone answering device 440 also includes a mode selector switch 434, for selecting the call screening function between OFF, ON and ACTIVE ON modes and the speaker function between loudspeaker and privacy screening modes. When operating in loudspeaker screening mode, the incoming call is amplified and audibly emitted through loudspeaker 421 so that it can be heard from a distance. When operating in privacy screening mode, the incoming call is routed to speaker 420 so that only the user can hear the incoming call by placing an ear close to the speaker 420. Alternatively, one speaker 420 can be used for both loudspeaker and privacy modes by amplifying the incoming call when operating in loudspeaker mode. The mode selector switch 434 may also include a screening-override function for preventing unauthorized screening of incoming or recorded messages. Preferably, the handset 402 includes a visual display 426 for displaying such information as a caller identification feature, the operating mode, how many messages are recorded in the telephone answering device 440 and/or within each of the "mailboxes", alphanumeric messages, etc. When the call screening function is set in ACTIVE ON mode and the speaker 420 is set in loudspeaker mode, the user can monitor all incoming calls in a hands-free manner. If the user chooses to answer the incoming call, the telephone answering device 440 can be interrupted by switching on the telephone function to answer the call. Optionally, the handset 402 may have a speakerphone function that can be used for hands-free calling. In an alternative embodiment, the handset 402 may operate with cellular phone technology, eliminating the need for the base unit 404. Alternate positions for the mode selector switch 434', visual display 426' and operational controls 430' are shown in FIG. 18.

Figure 19C:
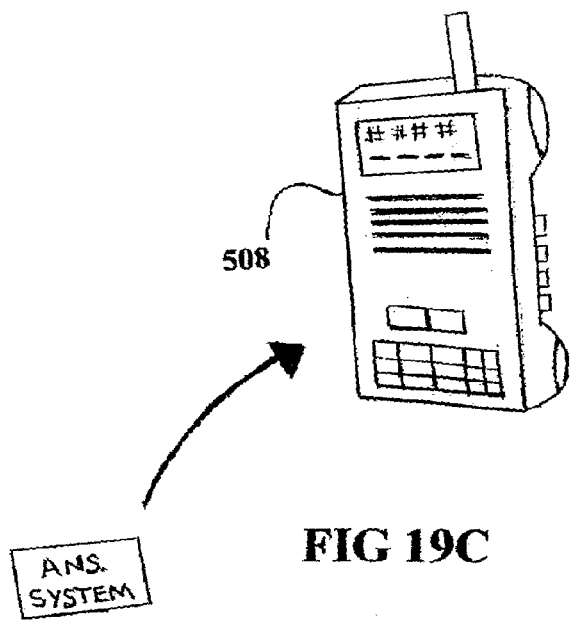
Figure 19D:
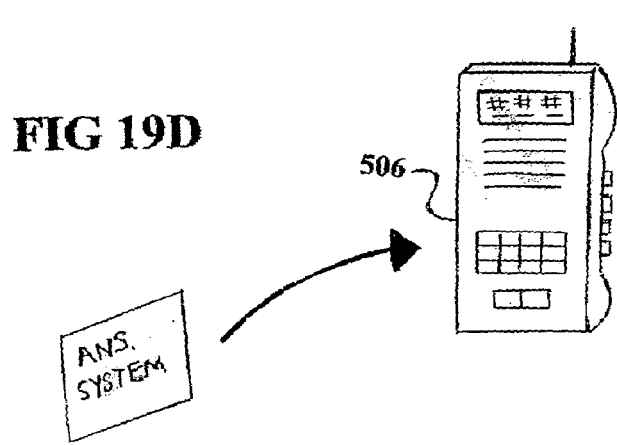
Figure 19E:
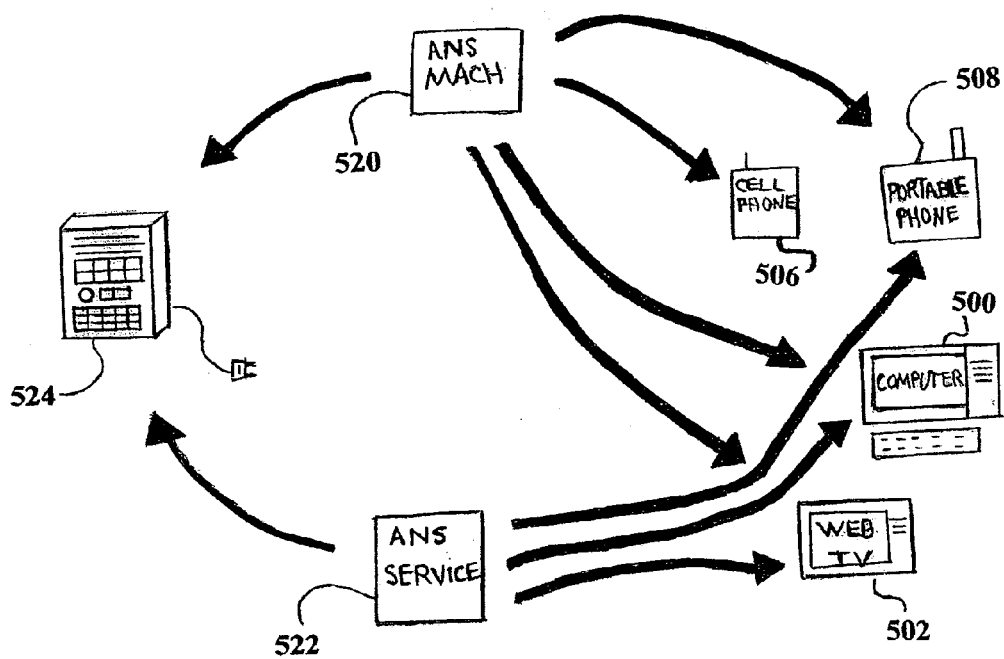

FIGS. 19A–19F show pictorial schematics of various embodiments and systems of a call screening device according to the present invention. FIG. 19A illustrates a call screening system with a device 500, such as a computer, an internet interface device or WEB TV device, with an internal answering system 524 for telephone messages, voice mail and/or e-mail and an outwardly audible screening device. Text messages, such as e-mail or alphanumeric pager messages, may be converted to speech to be audibly emitted by the call screening system with the aid of a speech synthesizer. This call screening system may be used alone or in connection with other remote screening devices. (Systems of a call screening device including such as FIG. 19A may also include) With or without "outside" buttons to control: ex. on/off, rewind, forward, record, without having to operate by keyboard or mouse. Being able to/and/or leaving screening switch "on" can enable a user to screen (ex. outwardly audible) his computer's "live" incoming calls that are concurrently being recorded onto the computer's answering system. The user could "listen in" on calls being currently left (which he otherwise couldn't before) and then decide to take the live caller. As illustrated in FIG. 19B, the device 500 may interface via direct or wireless connections with other devices, such as another computer or WEB TV device 502, a portable computer or personal digital assistant 504, such as a PALM PILOT, a cell phone 506, a cordless phone 508, and/or a household appliance 510, such as a refrigerator, which is integrated with or otherwise functions as a remote call screening device. A computer is capable of having a built in phone/and answering system in it. The answering system (built in) would be able to transmit (however way) to whatever is the remote screening system. (ex, a portable phone, a cell phone, web TV) and it could do this wirelessly, and/or through AC, and/or DSL, and/or Cable. The remote screening systems should have the ability to receive screen (whatever way) built into their system. This same can also be accomplished with the "starting point" being an answering service or device. (Systems of a call screening device including such as FIG B may also include) (There may be) a switch to pick which Remote/Appliance will screen. FIG. 19C shows a cordless phone 508 integrated with a remote call screening device. (Systems of a call screening device including such as FIG. 19C) may also include screening switch and/or remote operational buttons. FIG. 19D shows a cell phone 506 integrated with a remote call screening device. (Systems of a call screening device including such as FIG. 19D) may also include screening switch and/or remote operational buttons. FIG. 19E shows another variant of the call screening system with an answering machine 520 and/or an answering service or voice mail service 522, which may interface via direct or wireless connections with a remote call screening device 524 and/or other devices, such as a computer 500, WEB TV device 502, a cell phone 506 and/or a cordless phone 508, which is integrated with or otherwise functions as a remote call screening device. (Systems of a call screening device including such as FIG. 19E) may also include leaving voice message, then the computer types it out, (and) can (also) translate back to voice to let it have outwardly audible screening also. Sometimes (an) email (can) have an unpredictable delay, but that's ok, (as the system of a call screening device can still) have the "hear it" (outwardly audible) ability.

Figure 19F:
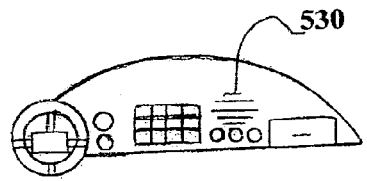

Any of the embodiments of the present invention described herein can also be adapted for audibly emitting and screening other types of messages, for example voice mail, internet or e-mail voice mail, instant messages, pager messages and e-mail. These messages may be received through a regular telephone line or other sources, such as the Internet, World Wide Web, cellular or satellite telephone or data transmissions, VoIP (voice over internet protocol), DSL (digital subscriber lines), television cable, etc. Text messages, such as e-mail, faxes or alphanumeric pager messages, may be converted to speech to be audibly emitted and screened by the Remote unit or a speaker on the answering means with the aid of a speech synthesizer. One application that can benefit from the features of the present invention is mobile computing. New on-board vehicle navigation, communication and infotainment systems, such as ONSTAR or VIRTUAL ADVISOR, have been developed that allow communication from cars and other vehicles. As illustrated in FIG. 19F, a remote call screening device 530 can be combined with the on-board communication system, to audibly emit incoming and recorded telephone messages, voice mail, e-mail, pager messages and the like. Hands-free voice activated telephone service and internet connections may also be incorporated for use in combination with the other features of the invention. With hands-free operation and speech synthesis of text messages, the remote call screening device 530 facilitates communication and helps to avoid driver distraction.

Although the present invention has been described using two-way radio communication between the answering machine or base unit and the Remote units, other wireless communications methods can also be used. For example, infrared wireless connections can be used between the answering machine or base unit and the Remote units. Likewise, other wireless connection protocols, such as the Bluetooth communication protocol, may be used. Alternatively, a house or building's electrical wiring system can also be used for communication between the answering machine and the Remote units and other appliances. Connections between units and/or with the internet may be implemented using HOMEPLUG power line networking. The answering machine and each of the Remote units can connect to the wiring system through their power cords for receiving power, as well as for sending and receiving communication signals. One way this can be implemented is using a high-pass filter in each device to separate the communication signals from the alternating current power signal. Using this system, a Remote unit can be plugged into an electrical outlet anywhere in the building for connection to the answering machine. Other electronic components, such as a computer for receiving e-mail and performing speech synthesis, can be connected to the answering machine and Remote units through the wiring system in a similar way. This system offers flexibility, but avoids potential security issues that could arise using radio transmissions which can be monitored from outside of the building.

The present invention may also embody visual video screening, wherein the user has the option to visually screen an incoming visual or video message from their unit or remote unit while the incoming visual or video message is being received without the caller or sender of the incoming visual or video message knowing that he or his message is being screened.

As the present invention already includes and may embody screening both voice and/or text, and may include the ability to convert an incoming text call into speech in order to audibly screen and/or the ability to convert an incoming speech call into text in order to visually read to screen, the present invention may also be useful for people who are hearing impaired and the people with whom they communicate whether they may be hearing impaired or not, wherein the hearing impaired called person may also find it useful to screen their calls or messages without the caller or sender of the incoming message knowing that his message is being screened and have the option to connect with the incoming caller should the hearing impaired called person decide while screening that the incoming call or message is important enough that they would like to engage in a conversation with the caller.

A further embodiment of the present invention would allow for a better system by which people who are hearing impaired or deaf may communicate with others that are also hearing impaired and yet also still be to be able to communicate with those that are not hearing impaired, and vice-versa. An embodiment may include and allow that a computer and/or phone, with phone or Internet access, including such as a land line, DSL, broadband, cable, modem, Internet, satellite, wireless capabilities and/or access, including such as cellular, and may or may not include or engage such as that of a TTY system, may be used for such communication. A computer keyboard, for example, would allow the hearing impaired person to type, in either long hand or shorthand, his portion of the conversation, it would then be converted to speech whereby a non-deaf person could option to receive the incoming text as text and/or speech. The non-deaf person could have the option of speaking his portion of the conversation into a receiver and having his conversation converted to text, whereby the hearing impaired person could have the option to receive the incoming portion of the conversation as text and/or streaming video or streaming text upon a visual screen or monitor including, for example, such as his computer's monitor.

The system may include such features as an answering system or machine that has the capability to answer the incoming text or voice messages sent to the hearing-impaired person when that person is unable to personally answer the incoming message, and record and save them in the form of text. And/or the system may include such capabilities as an answering system or machine that answers the incoming messages from a hearing-impaired person that may be incoming in the form of text and records them for the non-hearing impaired person in the form of text and/or converted speech. Such embodiments may also include such as LED indicators to indicate that messages have been received and the amount of messages received.

As technology proceeds further there will be more use of telecommunication devices that include the communication of visual images, including such as video-messaging, video-mail, video-Email, video-teleconferencing, and video-phones. There is a need for a way to answer and take the message from such incoming visual telecommunication when the called person is unavailable to personally answer such.

A further embodiment of the present invention may provide for a way to answer and take a message for such incoming visual telecommunication, including such as visually-taped-mail, video-mail, video-voice-mail, or video phone-mail (henceforth referred to simply as video-mail or video-messaging) when the called person is unavailable to personally answer such.

One way the present invention may provide for such is to include an embodiment of a video-mail capturing system or centralized video-mail station or system that picks up, answers, and records video-mail messages through a capturing system or a central station or system, much like that of a voice-mail system that picks up, answers, and records incoming telephone calls when the called person is unable to personally answer, yet wherein an embodiment of a video-mail capturing system or a centralized video-mail station or system accepts, or also accepts, video-mail.

In addition, the present invention may also include an embodiment of an answering machine that picks up, answers, and records, video-mail messages much like that of a telephone answering machine picks up, answers and records incoming telephone calls, yet wherein an embodiment of a video-mail answering machine accepts, or also accepts, video-mail.

Either type of embodiment may also include the ability to also pick up and answer and record that of other types of communication, including such as voice, text, fax, picture-messaging, email, or streaming video text.

Any embodiment of a video-mail message capturing or answering system, including centralized or that of a base machine unit, may be used with or incorporated with that of any type of communication means or device, including such as mobile or cellular phones, cell phones with internet interface, internet phones, PDA's, PDA's with internet interface, internet interface, landline phones of either standard or cordless, computers, videophones, television, vehicle mobile computing including such as vehicle on-board navigation, communication and infotainment systems including such as On-star or Virtual Advisor, and other types of remote units or communication devices including those that may incorporate, go through or utilize such as including the Internet, cable, Dish, satellite, DSL, global positioning satellite, video phone lines, landline lines. And all embodiments may preferably include the option to also accept voice and/or text messages.

And as technology proceeds even further with the use of such telecommunication or video/telecommunications that can include at least a two-way visual representation of conversation between users of telecommunication or video/telecommunications devices, there is a need for the screening of incoming video-mail or video messaging calls without the incoming caller or sender of the video-mail or video message of a video/telecommunications device knowing that their call is being screened by the user of another such type of device or remote unit.

The present invention includes an embodiment of a video-mail capturing system or a centralized video-mail message station or system that picks up and answers video-mail messages, and/or an embodiment of that of an answering machine that picks up and answers video-mail messages, can also be embodied with the additional capability to be able to visually screen the content of an incoming video message or video call while the incoming video message is still being sent by the caller or sender of the video message, wherein the person who is being called has the option to be able to visually screen and view the incoming video message or video call from his communication's device or remote unit without the caller or sender of the incoming video message knowing that they or their incoming video message or video call is being screened, allowing the called person the ability to ascertain and decide if the incoming message is important enough to establish a connection with the caller or sender of the incoming video-message or video call while the caller or sender is still leaving the video-message and while it is still being received and recorded by the screening apparatus. This video-message or video call screening mode would include the ability that even if the called person's means or medium of telecommunication also includes a camera for videoing his portion or side of a communication or conversation, for example such as a video phone or video mobile phone unit, the called person could option to shut off, or keep off, his own telecommunication's camera's viewing or videoing ability so that the incoming screened caller would not be able to see or view the called person through or via the called person's telecommunication's camera while the incoming caller's incoming call or message is being left and screened. The called person may at any point of screening the incoming video-message then option to establish a connection with the incoming caller of the incoming video-message and converse or communicate with the incoming caller by whatever is the called person's communication medium.

Depending on the called person's communication medium or device, the called person may opt to and be able to converse or communicate with the caller visually, including by such as his telecommunication's camera, such as on a video phone, video wireless phone unit, or web-cam, by switching back on his camera's viewing or videoing ability so that the incoming caller may then see the called person, and/or via text (including streaming video text), and/or audibly.

Embodiments of a video-mail answering system, or that of a video-mail answering machine, may also include the capability to turn off any audio and/or text portion of a video-message that may accompany that of the video-message, leaving only the video portion of the video-message on, with the option to do this while screening an incoming video-message or while replaying a recorded video-message.

Embodiments of a video-mail answering system or video-mail answering machine may also include the capability to turn off the video portion of a video-message that may also include audio and/or text, leaving only the audio portion and/or a text portion of a message on, with the option to do this while screening an incoming video-message or while replaying a recorded video-message.

Embodiments of a video-mail answering system, or that of a video-mail answering machine, may also include that of a remote pick-up function wherein accessing communication with the caller or sender of the incoming message will terminate the recording of the video-mail or video message.

Embodiments of a video-mail answering system, or that of a video-mail answering machine, may also include the ability to record the incoming caller's video-mail or video message conversation or communication once communication has already taken place with the called person without having to terminate the recording of the incoming caller's video conversation or message, wherein the user is able to record or keep recording the incoming caller's video-message or conversation, and/or just portions of the video-message or conversation, such as that of an audio, text, or just the visual video portion. This recording process may also include more than one direction of recording the communication or conversation, for example, two-way or three-way communication.

Embodiments of a video-mail answering system or that of a video-mail answering machine may also include the capability for "call forwarding", ex. from home number to mobile phone and vice-versa or the like.

In addition, there is a need for a way to answer an incoming telecommunication, including such as a mobile or cell phone call (which may include such as incoming video-mail call, voice call, or text call) when the called person is perhaps expecting a really important call that needs to be personally answered yet at the moment the caller is not in the opportune or appropriate place to take such a call when the call arrives. A further embodiment of the present invention would allow for a better system by which to do such.

An embodiment of the present invention may provide for a message capturing system (including such as a voice-mail message capturing system or the present invention of a video-mail capturing system or machine), and/or a message answering machine, with the capability to be able to put an incoming call, including such as incoming video-mail call, voice call, or text call, to including such as a mobile phone, into an "initial partial hold queue" status wherein, for example, the called person may be in a group meeting and may be unable to immediately personally answer the incoming call right at that particular moment without a disruption of the meeting by the called person answering and greeting such call and the called person asking the caller to hold on a minute while he (the caller) steps out into the hallway. The called person could pre-program the answering system of his telecommunication device, including such as a mobile or cellular phone, or at the quiet touch of a button, put an incoming call into the "partial hold queue" status whereby there would be an outgoing announcement or such to the incoming caller stating or indicating to the incoming caller that the called person has answered the incoming call and would be with the caller momentarily, asking the incoming caller to hold momentarily. This feature would, for example, allow the called person the time to quietly, and with decorum and propriety, step out of the meeting room and step into the hall to answer the incoming call in a less disruptive way so as not to disturb or interrupt the meeting, and in addition would allow the user to find a more private environment to take the call in, as well.

If an incoming call was very imperative and time was of-the-essence, this feature and capability could possibly avert a caller from having to leave a message and the called person from having to later retrieve the message, leaving perhaps an urgent or critical matter to temporarily go unattended or a significant opportunity to be missed. This could also circumvent a missed call should the call or caller not be of the type or nature to even leave a message.

This capability may also include a default feature wherein there may be a pre-determined "hold-time" wherein if the call in the "partial hold queue" status is left holding a pre-determined amount of time without the user having yet taken the call personally, then the call would automatically be routed to the message-taking system where the caller would be invited to leave a message, including such as a voice-mail, video-mail, or text message.

There may also include a feature that lets an incoming caller that has been put into the "partial hold queue" status to by-pass the "partial hold queue" status and go straight to the message-taking system should the caller decide he would rather leave a message than to hold, or continue to hold, momentarily.

As most telecommunication devices have a Caller-ID feature, a user could use a combination of Caller-ID with the "partial hold queue" capability with discrimination as to whom he wished to put into the "partial hold queue". And the user's telecommunication device, or it's answering system or answering machine, could be pre-programmed and set to activate this feature for either a specific incoming call or for all incoming calls, or it may be activated per incoming call.

Furthermore, the present invention may also utilize the audible and/or visual screening of an incoming call (including for such as an incoming video message, incoming audible message, and/or incoming text message) in combination with the present invention's "partial hold queue" capability, allowing the called person to actually hear and/or see the content of the incoming call or message before he decides whether or not to put the incoming caller into the "partial hold queue".

Figure 20:
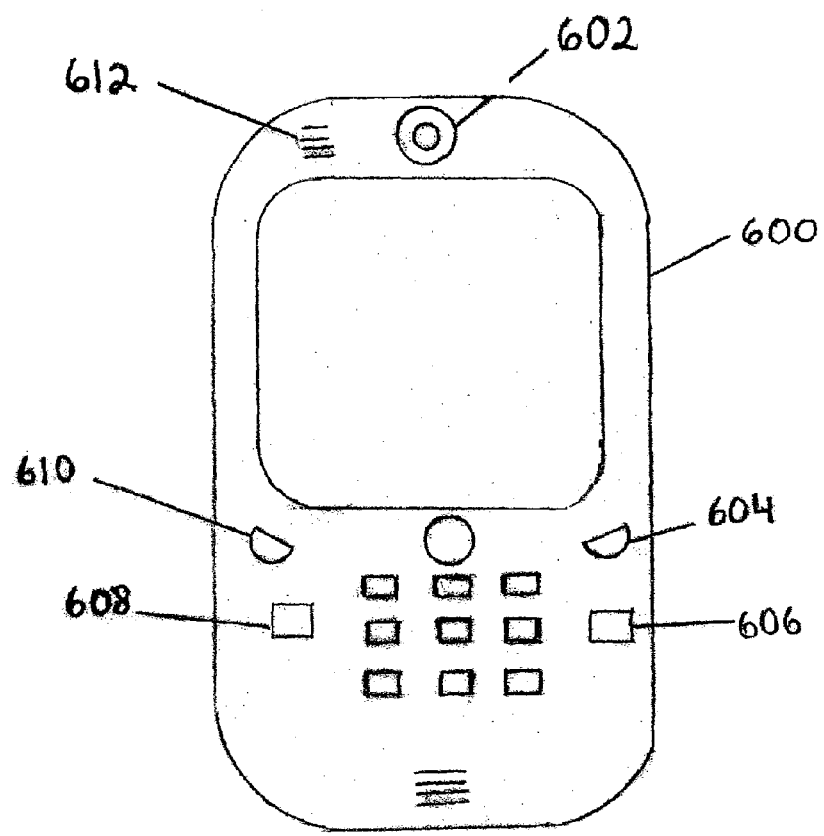
FIG. 20 shows a possible embodiment and system of a video call screening device
Figure 21:
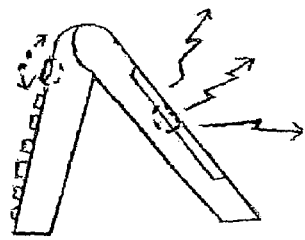
FIGS. 21–23 and FIG. 25 show examples or wireless phones, wireless phones with TTY, or PDA's embodied with an integrated projection means in which to screen and project incoming visual or video communications.
Figure 22:
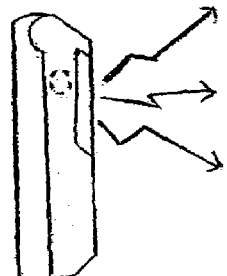
Figure 23:
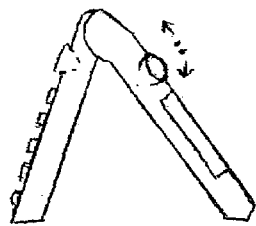
Figure 24:
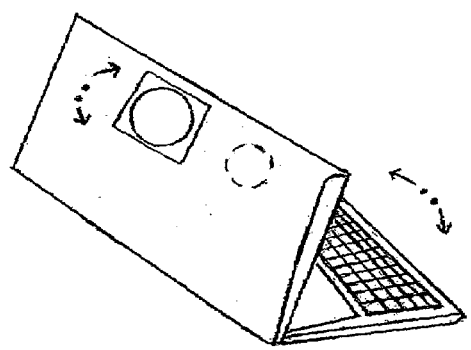
FIG. 24 shows an example of a PDA or wireless TTY communications unit with an integrated projection means in which to screen and project incoming visual or video communications.
Figure 25:
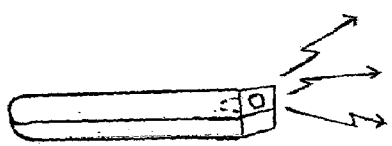
Figure 26A:
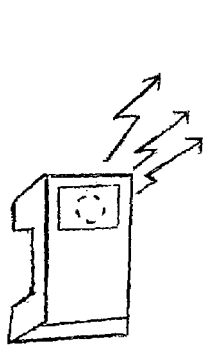
FIGS. 26A–26B shows an example of a cordless phone with an integrated projection means in which to screen and project incoming visual or video communications.
Figure 26B:
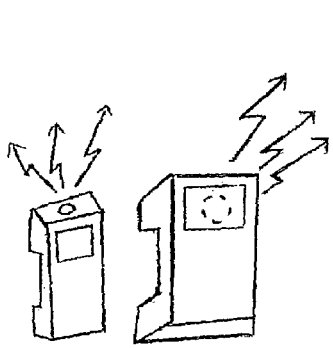
Figure 27:
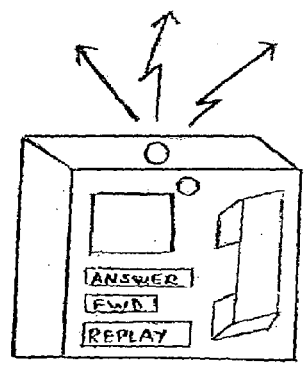
FIG. 27 shows an example of a video-phone with an integrated projection means in which to screen and project incoming visual or video communications.

FIG. 20 shows a possible embodiment and system of a video call screening device, the embodiment including a mobile or wireless phone 600 including a video camera 602, partial hold queue activator 604, incoming video screening activator 606, video message activator 608, incoming audio activator 610, and a speaker 612.

The present invention may also be embodied to include a feature that is an "emergency On activator", wherein a caller who has a specific code to do such may be able to remotely activate and turn on from his telecommunication device that of the Remote screening device that he is calling that may otherwise be in an "off" mode, in a silent "no ring" mode, or a "screening Off" mode. This would allow, for example, an incoming caller with an urgent or emergency call to be able to try and still be able to get the emergency call through to the called person through the screener even though the called person may have turned off, or turned down, his Remote Screening device.

An alternate way to do this would be to use "voice recognition" as a security, perhaps in addition to or instead of a specific code to activate an "emergency On activator". A voice command may be used to remotely turn this feature on and voice recognition could be used for security. Ex, a husband's voice saying "Screener on". Using voice recognition and command should make it easy to eliminate a caller from accessing the "emergency on" should the user ever want to stop a caller from accessing it again in the future, for example, just by erasing that voice from the memory of the system. Or if there is a code, the user could just change the code.

There may also include a way to shut down the "emergency On activator", preventing anyone from being able to activate it remotely.

This "emergency On activator" capability could be made to include the option to turn on any and/or all the remote screening units, which would help ensure a greater contact to anyone who might be around any of the remote screeners should there be an emergency.

Once activated, the "emergency On activator" could be made to allow calls or messages to come through the screener for an ongoing number of future incoming calls or for a one time activation of this feature.

An "emergency On activator" feature may be used with any type of screener, including voice, text, and/or video-mail screener.

The present invention may also be embodied to include that a satellite is the message capturing means that not only captures, answers, and records incoming voice messages, text messages and/or video messages, much like a voice mail system answers or captures voice messages, but that may also have the ability to send out, disperse and transmit or broadcast such messages, and any info relating to the message capturing means and/or such messages, to a remote answering device and/or remote screening device relating to, or belonging to, a particular user or to that of a particular family code, with the capability to disperse the messages out to any or all remote answering devices and/or remote screening devices, singularly or simultaneously, of or belonging to that particular user or family code. Again, a remote answering device and/or remote screening device may include such as a computer, web TV, phone, mobile or cell phone, vehicle mobile computing system or vehicle on-board communication system, and PDA. This would allow for a user to be able to receive messages and/or screen messages from anywhere, regardless of the user's location.

A platform software, or application software, may also be made to embody the capability to be able to do the such as noted above.

The present invention may also be embodied to include that the message answering device and/or message screening device includes the capability and/or programmability to translate an audible message into a specified language. For example, a call coming in and being recorded by a caller in English, may be screened by the user as, or later played back as, Spanish.

The present invention may also be embodied to include that a text-into-speech synthesis capability of a message answering device and/or message screening device may also include the capability and/or programmability to include such as foreign language or bilingual speech synthesis of the text message, wherein, for example, a text message coming in as English, may be synthesized and audibly screened by the user as, or later audibly played back by the user as, Spanish.

Any and all embodiments of the present invention may include or be embodied in such form as a platform software, or application software.

Any and all embodiments of the present invention may include any or all of the features as that mentioned above in the specification.

Video message screeners may be manufactured in different ways to work or interact with different embodiments of remote units.

CONCLUSION, RAMIFICATIONS AND SCOPE

Thus the reader will see that Remotes, having appropriate remote operating and/or receiving, and/or transmitting, components or circuitry, can interact with an answering machine having appropriate components or circuitry, allowing interaction and response between answering machine and Remotes and/or Remote capabilities, providing a convenient answering machine remote control and/or screening device that is not limited to a telephone or any single or specific type of telephone. Nor are Remotes limited to an area such as a "home base unit" for its power/recharging sources. The invention can provide for convenience, portability, and economy, and is simple such that it can be used by persons of almost any age.

It will be evident to those skilled in the art that a great many variants of the foregoing invention are possible.

From above descriptions, it should be apparent that the present invention is adapted, and can be adapted, to be used in a variety of locations and such that the Remotes may remain free-standing, be rested on a horizontal surface, supported from a vertical surface, placed in a supporting structure, housed within and incorporated within other units, etc.

The invention has the advantages in that it, depending on embodiment:

Provides an answering machine outwardly-audible remote screening unit or device. Of that which is not limited to the use of a telephone, any certain or specific type of telephone, or any limited number of telephones. The screening functions are made available to immediately relay incoming calls outwardly audible to the user via a Remote unit or device which allows the user to audibly screen his calls away from his answering machine, such as from another room or area. Such that the user can remotely listen to and screen incoming calls in any and more than one remote area, while caller is still on the line. Depending on embodiment, the user may have the capability to transport and/or vary placement of Remotes and/or the option to have multiple placed Remotes in many locales.

Provides an answering machine remote operational device and outwardly audible remote screening device of that which is not limited to the use of a telephone, any certain or specific type of telephone, or any limited number of telephones. Providing mechanisms to allow outwardly audible remote screening and the remote operation of an answering machine, via a Remote unit or device, accessing and allowing such possible functions as including, e.g.; on/off, stop, play (listen), replay, forward, record, etc. Providing remote access to an answering machine that possesses appropriate circuitry or components that allows for such remote functions to be carried out. The circuitry used for such operations is already known in the art. Various operational functions of an answering machine could be remotely carried out and made available to the user through a Remote unit or device. For example, the play or listen function on a Remote would access and play back recorded messages from an answering machine through the Remote outwardly audibly. The Remote unit or device with remote control abilities would also have the ability to remotely screen incoming calls outwardly audibly, immediately relaying incoming calls while a caller is still on the line. A Remote is available for the user to use in any, and more than one, remote area at a time, which allows the user the access to the functions of his answering machine, away from the answering machine itself, such as from another room or area, by way of Remote, and also allows the outwardly audible screening of incoming calls to the user, away from his answering machine. Depending on embodiment, the user may have the capability to transport and/or vary placement of Remotes and/or the option to have multiple placed Remotes in many locales.

Provides an answering machine outwardly audible remote screening unit or device and/or remote operational and outwardly audible remote screening unit or device that, for example, in a household or office where more than one person resides or works, a visual LCD screen on a Caller ID unit cannot provide for the fact that the different family members, housemates, or co-workers cannot possibly know all of the other family members' or co-workers' possible assortment of selected Caller ID telephone numbers or who it is exactly that is calling from those numbers.

Provides an answering machine outwardly audible remote screening unit or device and/or remote operational and outwardly audible remote screening unit or device that can be outwardly audibly heard from the Remote unit or device, across a room or distant area, without necessitating the user to search and locate a receiver in order to put it up to his ear to hear and screen the calls as one would have to do with such as that of the Scordato patent. Nor does the user of my invention have to get up in order to be able to get close enough to read a phone number displayed on an LCD screen in order to screen his phone calls, as one would have to do with a Caller ID unit. Nor does the user have to get up to go to the room where his answering machine is in order to be able to hear the calls in order to screen them.

Provides an answering machine outwardly audible remote screening unit or device and/or remote operational and outwardly audible remote screening unit or device that can be used by, for example, the whole family, roommates, etc. who can all listen or screen calls simultaneously, away from an actual answering machine unit, while waiting for their own individual prospective callers, because a Remote is outwardly audible from a distance. There is no need to put a telephone receiver to one single user's ear in order to hear and screen a caller, as one would have to do with the Scordato patent. Nor does one have to be in eyesight of an LCD screen, as one would have to be as such with a Caller ID unit. By the ability to hear and identify whom the incoming call is for, this provides not only for the obvious telephone screening uses but this can also eliminate a user from having to write down a message from a caller after picking up the telephone and finding that the call is not for him but for someone else, when otherwise, having known that the call wasn't for him, the user would have just let the answering machine pick up the caller's message.

By providing that the screening ability of a Remote unit or device (the sound coming from a Remote) can be audible a distance from the Remote itself, and also providing that a Remote can be left in an "On" mode, a Remote unit is capable of being used as a call screener "hands-free"; without the user having to be physically at a Remote in order to put the receiver up to his ear in order to hear and then screen the call to see if the call is for him, and without the user having to turn "On" the Remote per incoming call.

Provides an answering machine outwardly audible remote screening unit or device and/or remote operational and outwardly audible remote screening unit or device with the ability to outwardly audibly identify and hear the incoming caller and, importantly, by hearing the content of the incoming message, the user will learn the purpose of the incoming call, which can alert the user who would otherwise not pick up the phone to such as; an important call, an awaited call, a call that needs to be returned right away, or even an urgent or emergency call, etc. With a Remote, this screening process can be done "hands-free" (as stated above) and can also be done without the user having to stay transfixed to where his answering machine is in order to selectively screen calls when he does not want to bother picking up every phone call. The user can screen his calls from a remote area, a distance away from a Remote unit or device, and away from his answering machine unit, at his leisure, and be aware, by screening, of any important call that might happen to come through. Should the user then opt to pick up the telephone at any time, he may.

Provides an answering machine outwardly audible remote screening unit or device and/or remote operational and outwardly audible remote screening unit or device that is able to stay in an active (On) mode without necessitating a user to have to actively get up, search, and locate a telephone receiver in order to activate or depress a signal button or control switch as one would have to do with the Scordato patent. By eliminating this burdening step, it makes life a little more convenient, saving time and labor.

Can provide an answering machine outwardly audible remote screening unit or device and/or remote operational and outwardly audible remote screening unit or device that does not require a manufacturer predetermined matching code between an answering machine and Remote(s), as having a predetermined matching code can, depending on embodiment, limit the purchasing of additional Remotes at a later date.

Can provide an answering machine outwardly audible remote screening unit or device and/or remote operational and outwardly audible remote screening unit or device with a predetermined matching code between an answering machine and Remote(s), giving a manufacturer the option to include any multiple of corresponding coded Remotes in packaging. Thereby eliminating concerns of purchasing additional Remotes at a later date.

Can provide an answering machine outwardly audible remote screening unit or device and/or remote operational and outwardly audible remote screening unit or device, and/or an answering machine with: channel/frequency selection, automated and/or manipulable for:

a. best reception;

and/or b. to avoid possible interference;

c. so that other persons in, e.g. the same household, may own and operate their own individual answering machine units and Remote units or devices that can set to different channels so as to avoid interference and also allows for possible interchanging of units (as described earlier).

Provides an answering machine outwardly audible remote screening unit or device and/or remote operational and outwardly audible remote screening unit or device that can plug directly into a power outlet for a constant source of power.

Provides an answering machine outwardly audible remote screening unit or device and/or remote operational and outwardly audible remote screening unit or device that does not need recharging in a "home base unit", as does the Scordato telephone receiver/screener which needs recharging in the cradle of its "home base unit". Therefore it follows that a Remote is then capable of being placed in more convenient, remote locations, or transported to several locations, as its recharging abilities are not tied to where a "home base unit" resides.

Can provide an answering machine outwardly audible remote screening unit or device and/or remote operational and outwardly audible remote screening unit or device that has the capacity to recharge and yet simultaneously still maintain operating power so as to still be able to send, process, and receive transmitted signals so that screening and/or remote operation of an answering machine's functions can be indefinite. This means, that even while a Remote is recharging in or at a power source, it is still capable of being used, for example, as a screener, as the power source still enables the functions of a Remote to continue. Therefore the user does not have to give up any screening abilities when a Remote unit may be recharging. The same would be true of any remote control abilities of a Remote.

Can provide an answering machine with a Remote-overriding control switch, located on an answering machine, which can override a Remote's capabilities, providing the user with ultimate control over any Remote(s) in regard to his privacy. This Remote-overriding control switch is separate from that of a power control switch of an answering machine in such that turning Off or On the Remote-overriding switch does not interfere with an answering machine's power and functions.

Can provide an answering machine outwardly audible remote screening unit or device and/or remote operational and outwardly audible remote screening unit or device with more convenience and ease of portability with such possible embodiments of: small size, direct plug in, screening and/or remote capabilities available while simultaneously recharging, no need for "home base unit" for recharging, collapsible prong, clip member, aperture, etc.

Provides for greater economy, convenience, accessibility, versatility, and inconspicuous placement ability for reasons such as those stated above.

Additionally, my invention realizes an existing need and an almost untapped market. What is on the market is relatively unknown, uneconomical, or not practical, and does not provide for all the advantages that exist in my invention.

Since portable phones can be a relatively expensive purchase, my invention is more economical than the Scordato patent, as there is no necessity or requirement for the purchase of a cordless phone, nor any phone, for that matter. All that is needed is an answering machine, which most people have, especially people who want the ability to screen their phone calls. A user would be able to use my invention with any phone, or any combination of phones, that he may already have, as the type of phone used does not matter. Also, by having an embodiment option that makes possible the use and/or inclusion of more than one Remote per answering machine allows for greater economy and broader usage. There is no need to buy additional telephone receivers or additional telephone answering machine-telephone receiver/screener systems (as with the Scordato patent), which can be expensive, to broaden the area of remote screening placement.

Also, there is no need to purchase additional telephone services from a telephone company, as there is for the use of a Caller ID unit.

My invention is also more cost effective for manufacturers as:

Since it is less complicated, a Remote would be cheaper to build, and in turn, should be less expensive than the Scordato invention for consumers to buy. Less expensive means more affordability for the consumer, which, in theory, equals more chance that consumers will purchase.

Most households contain at least one answering machine, especially by people who want the ability to screen calls. Most answering machines are replaced every few years. Therefore, my invention should be easy to sell not only to consumers, but to manufacturers, as well.

Since, depending on embodiment, more than one Remote per answering machine may be purchased by consumers, this is also another potential selling point to/and for manufactures.

My invention could be made, sold, and utilized for many years throughout a changing technology without becoming outmoded or obsolete. And as stated earlier, my invention (either part: Remote or answering machine), its functions and capabilities, can be implemented and/or included into, with, or within any housing or device. The idea and purpose to audibly, remotely screen calls from an answering device or service and/or have remote operational access to an answering device, without the use of any type of phone, can be made to fit any change in technology. Hence, my invention has a long life cycle potential, which would justify capital expenditures for tooling and advertising.

My invention and its capabilities can be implemented or incorporated into any type of device or unit (as stated above), including and besides that of self-contained Remote units and/or self-contained answering machine units. This versatility would not only greatly expand the variety of ways and locations to use my invention but it would also accommodate change in technologies.

A surprising 37 percent of all Americans screen their phone calls through their answering machines, refusing to pick up the receiver until they hear who's calling. This statistic, in itself, is enough of a selling point to manufacturers and, obviously, consumers.

While my above description contains many specificities, these should not be construed as limitations on the scope of the invention, but rather as exemplifications of some of the preferred embodiments thereof. Many other variations are possible, including, for example:

Remotes can be of various types, including:

Remotes can be of the kind where it is receiver only;

Remotes can be the kind where it also includes remote control operational capabilities;

Remotes can be of the kind where it also includes a recording ability;

Remotes can be of the kind where it has remote control capabilities and also remote recording abilities;

Remotes can be of the kind where it has remote control capabilities, remote screening capabilities, and also remote recording abilities;

or include any combination thereof;

Remote units can have other, or any, shapes and/or sizes;

any or all functions and capabilities of a Remote may be incorporated into other various units or devices;

any or all functions and capabilities of an answering device or answering machine may be incorporated into other various units or devices;

the functions and capabilities of a Remote may be incorporated into a watch or timepiece;

the functions and capabilities of a Remote may accompany various other units or devices;

the functions and capabilities of a Remote may be made to interact with various other devices or units;

the functions and capabilities of a Remote may be made to work or interact with voice mail, voice mail centers, message centers, or call centers, such as that available through phone services;

locations of any features, including such as any LED's, function controls, outlets, prongs, clips, etc. are variable;

an On/Off control switch need not be included on either/or both an answering machine and/or a Remote;

there need not be a Remote-overriding control switch on an answering machine;

there need not be a volume control on a Remote;

On/Off and volume controls may be made combined into one control on a Remote;

a separate volume control on an answering machine may be added to control a Remote's audible level;

indicator LED lights can be added or eliminated, located anywhere, colored differently or the same, blink and/or have steady light;

a single LED light can serve for single or multiple purposes;

shape, including size, of either Remotes and/or answering machines can be altered;

antennas in/on either Remotes and/or answering machines need not be included;

rechargeability component in Remote need not be included;

the transmitter, receiver, answering machine and/or Remote may be controlled and/or operated by separate sources, such as electronic or computer hardware and/or software, and/or run off separate power sources;

Remotes may be run off of various types of power sources, including such as: rechargeable batteries, standard batteries, a recharging component, a recharging unit, internal charger, external charger, AC current, phone lines, etc. alone, alternately, or in combination;

Remotes may be recharged in a charging base;

channel and/or frequency selection, either manipulable or automatic, on either Remote and/or answering machine need not be included;

channel selections on either Remote and/or answering machine may be added;

a Remote may be corded;

a connector prong can be attached to a corded extension;

a corded extension may be retractable;

a connector prong can be stationary (fixed) or moveable (such as retractable or collapsible);

a collapsible connector prong need not be embodied;

a connector prong need not be embodied;

a phone line may be corded;

there may be connectors or inlets on a Remote to connect phones lines to a Remote;

an embodiment of a clip member may include a clip member's upper portion to be slightly bulging outward;

an outward bulge in a clip member together with a possible outward bulge or pad/stop on a Remote can possibly serve to keep a Remote unit substantially parallel to an engaging surface such as a table top or a wall outlet. An outward bulge or pad/stop may also be used as protection for or from engaging surfaces and/or for better protection from an outlet source. A pad/stop may also possibly provide a stopping means for a folding or moveable connector prong;

a space between the upper portion of a clip member and the back of a Remote unit can allow for varying thicknesses of different support structures;

an embodiment of a Remote unit may possibly include a recessed area that may help accommodate a lower portion of a possible clip member which could allow for a more secure adherence or attachment to support structures;

recessed areas for such things including a connector prong need not be embodied;

a clip member need not be embodied;

outwardly bulging portion of a possible clip member need not be embodied;

spacing between possible clip member and a Remote need not be embodied;

aperture need not be embodied;

a Remote or a clip member may include a magnetized material so that a Remote may be conveniently attached to a metal surface, including such as that of a refrigerator door;

a surrounding audio venting on Remote need not be embodied;

a two-way system can be incorporated so that an intercom ability or system exists between a Remote and another unit (such as that of an answering machine);

any embodiment of a Remote, or any unit or device that embodies, houses, or includes Remote capabilities and functions may also include remote operational abilities and access to an answering machine, and that remote operational access may also include the ability to externally audibly screen pre-recorded messages already left on an answering machine;

the Remote interactive capabilities of an answering machine can be made to run off rechargeable battery(ies);

rechargeable battery(ies) in an answering machine that enable interaction capabilities with a Remote can be capable of being recharged by the same energy source as the answering machine's power supply, thereby eliminating the need for frequent battery replacement or the need for separate battery recharging;

the Remote interactive capabilities of an answering machine can be made to run off standard battery(ies);

a Remote need not be embodied to allow such that a telephone's ring, or an alarm signal, be heard through it;

a Remote locator call-switch on an answering machine and/or a corresponding alarm sound and/or LED on a Remote need not be embodied;

a Remote may include a Caller ID display;

a Remote may remain free standing and/or include a number of various types of mounting structures, including, but not limited to, suction, hook-and-loop fasteners, etc.;

receptacles to hold Remote units may be embodied, on which may include a variety of attachment sources, including, but not limited to, double sided tape, hook-and-loop fasteners, magnetized material, or some other feasible attachment method;

a Remote and/or answering machine may incorporate voice scrambling and other eavesdrop securities;

a Remote's functions and capabilities may work with and/or be housed within any type of phone, including cellular, digital, analog or any other type of cordless phone;

a Remote's functions and capabilities that are included within corded, cellular, digital or analog phones can have non-external remote screening abilities, meaning that the remote audible screening of calls can be heard through the normal receiving ear portion (or venting) of the receiver;

a Remote's functions and capabilities can be included within a speaker phone;

a Remote's functions and capabilities that are included within a speaker phone can have the remote audible screening of the calls come through the same audio portion (or venting) as does the normal audio portion of the speaker phone or separately through its own audio portion (or venting);

an ear piece or earphones can be attached to a Remote for private screening use;

a Remote's functions and/or capabilities can be used with phone and/or answering systems that are already installed or can be installed within computer systems;

a Remote's features, functions, and capabilities may be included within a phone handset or receiver, the receiver may be corded or cordless;

in embodiments of a Remote that are included within a phone handset or receiver, the audio speaker venting (screening portion) may be on the external face of the receiver, may surround the receiver, may be on the internal face of the receiver;

in embodiments of a Remote that are included within a phone handset or receiver, the external audible screening may come through the same receiving piece or venting of the receiver as does the normal audio portion of the phone;

a Remote may be manufactured with a corded phone line built in or detachable (where a phone line can be inserted), or have a phone connector prong extending from Remote.

It is to be understood that the invention is not limited to any precise form of apparatus or example as noted above, and that various changes and modifications may be made by those skilled in the art without departing from the scope or the novel concepts of the invention and are to be construed as being within the ambit of the appended claims.

It is a purpose of the instant application to provide a way to screen and enlarge an incoming visual or video message communication, allowing a called person to more comfortably view to screen the incoming visual or video message communication and more easily discern who and what is being presented in the incoming visual or video message communication, yet still be able to keep the size and weight of the communication unit diminutive.

The present invention includes the capability to visually screen by projection incoming visual or video communication calls and/or messages from a communication device, or answering unit, while the visual or video calls or messages are still incoming or while the caller or sender still has a link with the communication system, so that a user (the called person) may see (by projected display) who is calling or sending the incoming call or message and what it is they are communicating.

Communications units, in the present invention, may include such as telephones, home-base type telephones, portable cordless telephones, corded telephones, home-base type video phones or video phone answering machines, cordless video phones, communication equipment with internet and/or telephone video capabilities including such as VoIP, wireless mobile or cellular video phones, wireless mobile or cellular camera phones, home-base type camera phones or camera phone answering machines, wireless mobile or cellular telephones, communication equipment such as computers or laptop computers or notebooks, PDAs (personal digital assistants), any portable communication unit with internet access and/or telephone and/or modem ability, any communication unit portable or otherwise with or that includes the ability for type or text input and transmission including such as TTY, any communication unit with internet access and/or telephone and/or modem ability, or any combination device that may also include any of the such, for example including such as a PDA with telephone receiver, PDA with internet access and ability, wireless mobile or cellular telephones with internet access and ability, portable communications device with keyboard apparatus, etc. . . .

For the purpose of illustration only, the present invention will mostly refer to wireless mobile/cellular telephones or PDAs, each having at least one or both of telephony receiver capabilities and/or internet access and ability, and both with the ability to receive or view visual calls and messages and/or video calls or video messaging of video communication. Visual calls may also include any kind of text calls, including such as text messaging calls, text calls, streaming text calls, and TTY calls.

It is an advantage of the present invention to provide a new and improved communications unit or system that allows projected screening of incoming visual or video calls or messages from an incoming caller of sender who is still leaving a message that is being recorded, or answered and recorded, or who is still linked to the communication system upon leaving a message, wherein there is embodied an image or moving-image projection means integrated at least partially within a communication unit and/or integrated at least partially within an answering machine. This may include communication units including such as wireless mobile phones, PDAs, computers, cordless phones wherein there is embodied an image or moving-image projection means integrated at least partially within the communication unit It is an advantage of the present invention to provide a new and improved communications answering unit that allows projected screening of incoming visual or video calls or messages from an incoming caller of sender who is still leaving a message that is being recorded, or answered and recorded or who is still linked to the communication system upon or after leaving a message, wherein there is embodied a projection means integrated at least partially within an answering unit, including such as an answering machine-type unit.

It is an advantage of the present invention to provide a new and improved visual or video communications answering system that allows for the projected screening of incoming visual or video calls or messages from an incoming caller of sender who is still leaving a message that is being recorded, or answered and recorded or who is still linked to the communication system upon or after leaving a message.

An answering system may include that of a wireless carrier's answering system or means, wherein an incoming visual or video call that is answered and recorded by the answering system of the wireless carrier may be screened by projection from a communication unit, including from such as a wireless phone, PDA, or computer.

An answering system may be embodied within an Internet system wherein an incoming visual or video call that is answered and recorded by the answering system of the Internet system may be screened by projection from a communication unit, including from such as a wireless phone, PDA, or computer.

The communication unit, or answering unit, would be embodied with a projection means integrated at least partially within the units providing an enlarged visual/video call or message communications display ability requiring substantially less space of the communication unit, or answering unit, and provide a useful and easily viewable display from which to screen incoming recorded, or answered and recorded calls or messages or a visual or video image of an incoming caller or sender who is about to leave a message or has just finished leaving the message and is still linked to the communication system.

Another embodiment may include that there is separate projector means external to the communications unit, or answering unit, that is linked or communicates with the communications unit, answering system, or answering unit, wherein an incoming visual or video call or message that is being recorded, or answered and recorded, or a visual or video image of an incoming caller or sender who is about to leave a message or has just finished leaving the message and is still linked to the communication system may be projected and displayed for the user to screen. It is preferable that this separate projector means is portable.

It is an advantage of the present invention to provide a new and improved communications unit, or answering unit, with an integrated or built-in image, or moving-image, projection means at least partially inside unit, capable of screening while projecting for display from the unit the visual call or message communications and/or video calls or messages of video communications that are being answered and recorded onto surfaces external to the unit.

It is an advantage of the present invention to provide a new and improved screening means with an image projection means capable of screening while projecting for display a visual or video call or message communication that is being answered and recorded onto surfaces connected or peripheral to a communications unit, or answering unit.

The present invention may be embodied to be capable of screening while projecting for display from the communication unit a visual component of an incoming call or message communications that includes visual images while the caller or sender's message is still being recorded and while the caller or sender still has a link with the communication system. Of-course, any audio component of an incoming visual or video call or message may be emitted from the communication unit, or answering unit, while projection screening of the incoming visual or video call or message.

The term "incoming" in the instant application refers to the end user receiver being able to project while screening an incoming visual or video call or message, or incoming call that contains visual or video images, that is being answered and recorded by an answering system ex. videomail, or an answering unit, while the sender is still communicating the call including such as by verbally, typing, texting, TTY, videoing, photographing, or otherwise still communicating the call, while the sender is still transmitting the visual or video call or message or incoming call that contains visual or video images, or while the sender of the call still has a link with the communication system upon or after leaving the recorded message, or any combination of such, wherein the user has not answered, connected, or linked with the caller or sender. This may include that the caller or sender of the visual or video communications has actually finished talking and/or typing, and/or texting and/or videoing, and/or photographing, yet still remains on the line or linked to the communication system, not yet having terminated the connection.

It is an advantage of the present invention to provide a new and improved communications unit, or answering unit, with an integrated or built-in image, or moving-image, projection means at least partially inside unit, capable of screening while projecting for display from the unit the visual call or message communications and/or video calls or messages of video communications that are being answered and recorded onto surfaces external to the unit.

The invention may also be embodied as an home based video-phone unit, with an integrated or built-in image and/or moving-image projection means capable of screening while projecting the visual or video calls or messages that are being answered and recorded.

An incoming visual call, may include such as images, video, and/or text.

The present invention can include and screen while projecting for display incoming visual calls or messages. "Visual calls and messages", "visual messaging", and "visual images" may be or may include such as incoming still images including such as pictures and/or may also include such as that of other images including such as various types of texting calls or messages.

It is an advantage of the present invention to provide a new and improved communication unit with an integrated screening means that allows for the projected screening of incoming visual or video communications that is more beneficial to users that are hearing-impaired. A projected and screened incoming visual call, which may include such as images, video, and especially texting, including such as TTY texting, that can be enlarged by projection and display from the communication unit of the present invention, allows for a more comfortable screening and viewing set-up and less strain to the eyes for a user who must attain his communication in a visual manner. A projected screened incoming call or message for those users who communicate by alphanumeric characters, including such as type, texting, or TTY, may be projected and emitted from such embodiments that include that of a keyboard, integrated into or with, or otherwise linked to, the communication unit, or answering unit, of the present invention for transmission of such, including such as projected screening from, for example, a Blackberry, a cell phone or PDA with keyboard, a cell phone with TTY capabilities, a standard-style TTY, a standard-style video phone with TTY capabilities, etc . . . .

The incoming screened projected visual or video images may be received from or utilize that from any visual/video communications or broadcasting source, including such as that of, or which utilizes, Media-Player, Inter-Video, V-cast, streaming video, telecommunication transmission wireless telecommunication transmissions, Internet transmissions and/or computer transmissions, wireless broadband network, high speed networks, EV-DO, stream data, flash, macromedia flash, flash enabled, streaming MP3 and video, walkie-talkie, Video-On-Demand, or other formatted types of visual or video image communications.

This invention may also work with embodiments of a video-mail answering system, or that of a video-mail answering machine or unit. The projection communication unit's answering system, or an answering unit with a projection means, can also project and display video calls or messages that have already been sent by a caller who has already left a video call or video mail message, being replayed, projected and displayed at user's discretion. The present application may also include the ability to project and display a user's answering system's, or answering unit's, outgoing visual-mail greeting, either upon user's recording the greeting, upon an incoming visual call be answered by answering means, or at user's discretion.

The present application may also include the ability to record and store any of the user's outgoing sent visual or video call or messages with the capability to replay and project such calls or messages at a later time or date. This may include such as a user's visual or video message, a text-style message and/or a combination video text-style message.

This invention may also work with embodiments of a video-mail answering system or that of a video-mail answering machine that may also include the capability for "call forwarding", ex. from home number to mobile phone and vice-versa or the like.

This invention may also work with visual or video messages that are transmitted over a bundled or a dual service wherein there may also be embodied a single video, or video/voice, mailbox for the landline and wireless calls whereby, with the present invention, the user can screen while projecting for display, both his cell phone visual calls and landline visual calls through a single video, or voice/video, mailbox.

The present invention can also include and screen while projecting for display incoming visual calls or messages that may include such as incoming text calls or messages, incoming text of TTY, incoming text of streaming text, incoming text of scrolling text, incoming text of streaming video text, picture calls and messages.

The present invention can screen by projection incoming visual and/or video calls from a standard video phone. The present invention can screen by projection incoming visual communications and/or video communications that are received from or through the Internet.

The present invention can screen by projection incoming visual communications and/or video communications that are received using VoIP or Video VoIP.

The present invention can include screening by projection that of incoming visual communications and/or video communications including such as a visual or video call that is currently still being recorded, conveyed, relayed, related, imparted, communicated, sent, transmitted, spoken, texted or typed or TTY'd, videoed, photographed, or imaged, spoken or acted out by the caller or sender or while the caller or sender of the communication still has a link or association with communication system upon leaving a recorded message or prior to commencement of leaving a recorded message. This can include such as real-time answered and recorded visual or video messaging or near-real-time answered and recorded visual or video messaging.

While screening, the projected and displayed incoming visual or video communications, may be enlarged at user's discretion for ease of viewing.

The screened projected image of the visual or video communications is capable of being displayed onto a surface external to the communication unit's housing or casing and spaced a distance from the projection means and/or the housing of the communication unit, yet still allowing for clarity.

A preferred embodiment of the present application for a communication unit's projection means to project a screened visual or video call or message onto a projection surface that is external and separate from that of the communication unit's housing or casing. The screened projected image of the visual or video communications is preferably capable of being projected onto any type of projection surface including such as that of a nearby or remote wall or a piece of paper. A communications unit including such as a wireless mobile cellular phone or PDA with an integrated projector for projecting and displaying the screened visual or video communications onto an external and separate surface would provide the user (the called person) with the benefit and option of a larger visual display of a screened incoming visual or video call or message communication, and/or a larger visual display of a played-back visual call or video call or message communication, easing the strain on the user's eyes, allowing to see things in greater detail, and making for a more enjoyable viewing experience. It also provides more comfortable viewing and reduces strain on eyes and provides amount of magnification.

A communications unit, with an integrated projector allowing for the screening of projected incoming visual or video communications, that interacts with an answering system or an answering unit, also allows the manufacturers of a video-mail enabled communication unit or video-message enabled answering unit to keep the customary visual screen of the communication unit to a minimum size and therefore to keep the size and the weight of the communication unit to a minimum.

A screened projected visual or video image of the present invention may also include or comprise various types or modes of incoming communications, including such as characters, graphics, images, alphanumeric images, text, TTY, type, moving or scrolling text, streaming text, streaming video text, pictures, etc . . . .

The screened projected visual or video images may come from a docking station made for a portable handheld communications unit, the communications unit imparting the incoming visual or video image to and through the projection means of the docking station in order for the user to project and screen an incoming visual or video call.

The screened incoming visual or video communications may come from or through Internet transmissions. For example, Internet enabled computers, PDAs, wireless cell phones, or VoIP phones having the integrated projection means of the instant application can screen projected visual or video images sent from or through the Internet or by Internet transmissions.

It is preferable that the communication units, or answering units, of the present invention include a means for the use to turn on or off the screening projection means.

The visual or video communications or transmissions, communication units, answering systems, or answering units, of the instant application can include or embody to screen and/or receive to screen visual or video call or message communications and/or other types of visual or video images over, through, with, or from, singularly or in combination via a wireless mobile phone system, carrier, network, or server, ISP, Internet, World Wide Web, DSL, cable, computer, video phone, mobile wireless or cellular video phone, cell phones with internet interface, wireless video phones, satellite telephones, broadband, wireless broadband, high speed network, walkie-talkie, cable, modem, landline, satellite, standard or cordless landline video phones, video e-mail, centralized video mail, video voice-mail, PDA's, internet phones, PDA's with internet interface, computers with internet interface, television, television cable, Ethernet, VoIP (voice over internet protocol), VoIP (Video over internet protocol), which may also include that of transmission of visual or video calls or messages, data transmissions, radio transmissions, internet transmissions, infrared, HOME PLUG, BLUETOOTH, wireless transmissions, and/or Vehicle mobile computing or communication systems including that of vehicle on-board navigation, communication and infotainment systems that allow communication to and/or from vehicles including On-star and Virtual, TTY transmission, calls or messaging with text.

The present invention includes the capability to visually screen by projection incoming visual or video communication calls and/or messages from a communication device, or answering unit, while the visual or video calls or messages are still incoming or while the caller or sender still has a link with the communication system, so that a user (the called person) may see (by projected display) who is calling or sending the incoming call or message and what it is they are communicating.

It will be appreciated by those skilled in the art that various modifications and changes could be made to the invention or its embodiments described and shown herein without departing from the scope of the invention, and that further modifications and improvements will occur to those skilled in the art. It should therefore be understood this invention is not limited to the particular forms shown or described herein and that the claims are not to be considered as being limited to the precise embodiments of the invention set forth above. Accordingly, it is intended that the appended claims cover all modifications, alternative aspects or embodiments that do not depart from the spirit and scope of the invention.

I claim:

1. An apparatus or communication system for screening the incoming visual or video message-content of incoming visual or video message communications by visually projecting said visual message-content outward from said apparatus or communication system onto surfaces external to said apparatus or communication system comprising:
   portable handheld communications unit
   an answering means or system for answering and recording an incoming visual or video communication
   said portable handheld communications unit including a built-in integrated or collectively housed image or moving-image projection means housed at least partially within said portable handheld communications unit for visual screening by image or moving-image projection display the incoming message-content of the incoming visual or video call or message communications onto surfaces external to said portable handheld communications unit
   wherein the user of said portable handheld communications unit has not yet answered, connected, or linked with the caller or sender and the sender is still communicating the visual message-content of the incoming visual or video communication or still has a link with said communication system.

2. The apparatus of claim 1, wherein
   said portable handheld communications unit is a wireless mobile cell phone.

3. The apparatus of claim 1, wherein
   said portable handheld communications unit is a PDA.

4. The apparatus or communication system of claim 1, wherein
   the user is able to project and display visual message-content of stored visual or video message communications from said portable handheld communications unit onto surfaces external to said portable handheld communications unit.

5. The apparatus of claim 1, wherein
   said apparatus or communication system for screening and projecting the incoming visual or video message-content of incoming visual or video message communications includes that of the Internet
   whereby the incoming screened and projected visual or video communications are received via Internet.

6. The apparatus of claim 5, wherein
   said answering means or system for answering and recording an incoming visual or video communication received via Internet access is an answering and recording means or system of said Internet.

7. The apparatus of claim 5, wherein
   said incoming screened and projected visual or video communications are received using VoIP or Video VoIP.

8. The apparatus of claim 1, wherein said visual message-content of incoming visual or video message communications are or include that of text or TTY transmissions.

9. An apparatus or system of a wireless telecommunication system for screening the incoming visual or video message-content of incoming visual or video message wireless communications transmissions by visually projecting said visual message-content outward from said wireless telecommunication apparatus or system onto surfaces external to said apparatus or system comprising:
   an answering and recording means of said wireless telecommunication system for answering and recording an incoming visual or video communication
   a portable handheld wireless communications unit
   said portable handheld wireless communications unit including a built-in integrated or collectively housed image or moving-image projection means housed at least partially within said portable handheld wireless communications unit for visual screening by image or moving-image projection display the incoming message-content of the incoming visual or video call or message communications onto surfaces external to said portable handheld wireless communications unit
   wherein the user of said wireless communications unit has not yet answered, connected, or linked with the caller or sender and the sender is still communicating the visual or video communication or still has a link with said wireless telecommunication system.

10. The apparatus or system of a wireless telecommunication system of claim 9, wherein
    the user is able to project and display visual message-content of stored visual or video message communications from said portable handheld wireless communications unit onto surfaces external to said Portable handheld wireless communications unit.

11. The apparatus or system for screening the incoming visual or video message-content of incoming communications of claim 9, wherein
    said portable handheld wireless communications unit with projection screening means is a wireless mobile cell phone.

12. The apparatus or system for screening the incoming visual or video message-content of incoming communications of claim 9, wherein
    said portable handheld wireless communications unit with projection screening means is a PDA.

13. An apparatus or communication system for screening the incoming visual or video message-content of incoming visual or video message communications by visually projecting said visual message-content outward from said apparatus or communication system onto surfaces external to said apparatus or communication system comprising:
    portable handheld communications unit
    an answering means or system for answering and recording an incoming visual or video communication
    at least one of said portable handheld communications unit or answering means or system including a built-in integrated or collectively housed image or moving-image projection means housed at least partially within said communications unit for screening by image or moving-image projection display the incoming message-content of the incoming visual or video call or message communications onto surfaces external to at least one of said portable handheld communications unit or answering means or system wherein the user of said apparatus or communication system has not yet answered, connected, or linked with the caller or sender and the sender is still communicating the visual message-content of the incoming visual or video communication or still has a link with said communication system.

14. An apparatus or system of a wireless telecommunication system for screening the incoming visual or video message-content of incoming visual or video message wireless communications transmissions by visually projecting said visual message-content outward from said wireless telecommunication apparatus or system onto surfaces external to said apparatus or system comprising:

a portable handheld wireless communications unit with visual or video image recording or storing means an answering means or system within or utilized by said apparatus or system of said wireless telecommunication system for answering an incoming visual or video communication said portable handheld wireless communications unit including a built-in integrated or collectively housed image or moving-image projection means housed at least partially within said portable handheld wireless communications unit for visual screening by image or moving-image projection display the incoming message-content of the incoming visual or video call or message communications onto surfaces external to said portable handheld wireless communications unit wherein the user of said wireless communications unit has not yet answered, connected, or linked with the caller or sender and the sender is still communicating the visual or video communication or still has a link with said wireless telecommunication system.

15. The apparatus or system for screening the incoming visual or video message-content of incoming communications of claim 14, wherein said answering means or system within or utilized by said apparatus or system of said wireless telecommunication system also records or stores the incoming visual or video message-content of incoming visual or video message wireless communications transmissions.

* * * * *